United States Patent
Krishna Kumar et al.

(10) Patent No.: US 9,141,874 B2
(45) Date of Patent: Sep. 22, 2015

(54) FEATURE EXTRACTION AND USE WITH A PROBABILITY DENSITY FUNCTION (PDF) DIVERGENCE METRIC

(71) Applicant: QUALCOMM Incorporated, San Diego, CA (US)

(72) Inventors: Raj Kumar Krishna Kumar, Bangalore (IN); Pawan Kumar Baheti, Bangalore (IN); Dhananjay Ashok Gore, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 13/789,549

(22) Filed: Mar. 7, 2013

(65) Prior Publication Data

US 2014/0023278 A1    Jan. 23, 2014

Related U.S. Application Data

(60) Provisional application No. 61/673,677, filed on Jul. 19, 2012.

(51) Int. Cl.
*G06K 9/46* (2006.01)

(52) U.S. Cl.
CPC ............ *G06K 9/4671* (2013.01); *G06K 9/4647* (2013.01); *G06K 2209/01* (2013.01)

(58) Field of Classification Search
None
See application file for complete search history.

(56) References Cited

U.S. PATENT DOCUMENTS

| 3,710,321 A | 1/1973 | Rubenstein |
| 4,654,875 A | 3/1987 | Srihari et al. |
| 5,321,768 A | 6/1994 | Fenrich et al. |

(Continued)

FOREIGN PATENT DOCUMENTS

| EP | 1146478 A2 | 10/2001 |
| EP | 1840798 A1 | 10/2007 |

(Continued)

OTHER PUBLICATIONS

Dalai, Navneet, and Bill Triggs. "Histograms of oriented gradients for human detection." Computer Vision and Pattern Recognition, 2005. CVPR 2005. IEEE Computer Society Conference on. vol. 1. IEEE, 2005.*

(Continued)

*Primary Examiner* — Chan Park
*Assistant Examiner* — Geoffrey E Summers
(74) *Attorney, Agent, or Firm* — Silicon Valley Patent Group LLP

(57) ABSTRACT

An image of real world is processed to identify blocks as candidates to be recognized. Each block is subdivided into sub-blocks, and each sub-block is traversed to obtain counts, in a group for each sub-block. Each count in the group is either of presence of transitions between intensity values of pixels or of absence of transition between intensity values of pixels. Hence, each pixel in a sub-block contributes to at least one of the counts in each group. The counts in a group for a sub-block are normalized, based at least on a total number of pixels in the sub-block. Vector(s) for each sub-block including such normalized counts may be compared with multiple predetermined vectors of corresponding symbols in a set, using any metric of divergence between probability density functions (e.g. Jensen-Shannon divergence metric). Whichever symbol has a predetermined vector that most closely matches the vector(s) is identified and stored.

23 Claims, 11 Drawing Sheets

(56) References Cited

U.S. PATENT DOCUMENTS

| | | | |
|---|---|---|---|
| 5,459,739 A | 10/1995 | Handley et al. |
| 5,465,304 A | 11/1995 | Cullen et al. |
| 5,519,786 A | 5/1996 | Courtney et al. |
| 5,563,403 A | 10/1996 | Bessho et al. |
| 5,633,954 A | 5/1997 | Gupta et al. |
| 5,751,850 A | 5/1998 | Rindtorff |
| 5,764,799 A | 6/1998 | Hong et al. |
| 5,768,451 A | 6/1998 | Hisamitsu et al. |
| 5,805,747 A | 9/1998 | Bradford |
| 5,835,633 A | 11/1998 | Fujisaki et al. |
| 5,844,991 A | 12/1998 | Hochberg et al. |
| 5,978,443 A | 11/1999 | Patel |
| 6,023,536 A | 2/2000 | Visser |
| 6,092,045 A | 7/2000 | Stubley et al. |
| 6,266,439 B1 | 7/2001 | Pollard et al. |
| 6,393,443 B1 | 5/2002 | Rubin et al. |
| 6,473,517 B1 | 10/2002 | Tyan et al. |
| 6,674,919 B1 | 1/2004 | Ma et al. |
| 6,678,415 B1 | 1/2004 | Popat et al. |
| 6,687,421 B1 | 2/2004 | Navon |
| 6,738,512 B1 | 5/2004 | Chen et al. |
| 6,954,795 B2 | 10/2005 | Takao et al. |
| 7,110,621 B1 | 9/2006 | Greene et al. |
| 7,142,727 B2 | 11/2006 | Notovitz et al. |
| 7,263,223 B2 | 8/2007 | Irwin |
| 7,333,676 B2 | 2/2008 | Myers et al. |
| 7,403,661 B2 | 7/2008 | Curry et al. |
| 7,450,268 B2 | 11/2008 | Martinez et al. |
| 7,724,957 B2 | 5/2010 | Abdulkader |
| 7,738,706 B2 | 6/2010 | Aradhye et al. |
| 7,783,117 B2 | 8/2010 | Liu et al. |
| 7,817,855 B2 | 10/2010 | Yuille et al. |
| 7,889,948 B2 | 2/2011 | Steedly et al. |
| 7,961,948 B2 | 6/2011 | Katsuyama |
| 7,984,076 B2 | 7/2011 | Kobayashi et al. |
| 8,009,928 B1 | 8/2011 | Manmatha et al. |
| 8,189,961 B2 | 5/2012 | Nijemcevic et al. |
| 8,194,983 B2 | 6/2012 | Al-Omari et al. |
| 8,285,082 B2 | 10/2012 | Heck |
| 8,306,325 B2 | 11/2012 | Chang |
| 8,417,059 B2 | 4/2013 | Yamada |
| 8,542,926 B2 | 9/2013 | Panjwani et al. |
| 8,644,646 B2 | 2/2014 | Heck |
| 2002/0037104 A1* | 3/2002 | Myers et al. ............ 382/187 |
| 2003/0026482 A1 | 2/2003 | Dance |
| 2003/0099395 A1 | 5/2003 | Wang et al. |
| 2003/0215137 A1 | 11/2003 | Wnek |
| 2004/0179734 A1 | 9/2004 | Okubo |
| 2004/0240737 A1 | 12/2004 | Lim et al. |
| 2005/0041121 A1 | 2/2005 | Steinberg et al. |
| 2005/0123199 A1 | 6/2005 | Mayzlin et al. |
| 2005/0238252 A1 | 10/2005 | Prakash et al. |
| 2006/0039605 A1 | 2/2006 | Koga |
| 2006/0215231 A1 | 9/2006 | Borrey et al. |
| 2006/0291692 A1 | 12/2006 | Nakao et al. |
| 2007/0110322 A1 | 5/2007 | Yuille et al. |
| 2007/0116360 A1 | 5/2007 | Jung et al. |
| 2007/0217676 A1 | 9/2007 | Grauman et al. |
| 2008/0008386 A1 | 1/2008 | Anisimovich et al. |
| 2008/0063273 A1 | 3/2008 | Shimodaira |
| 2008/0112614 A1 | 5/2008 | Fluck et al. |
| 2009/0060335 A1* | 3/2009 | Rodriguez Serrano et al. ............ 382/177 |
| 2009/0202152 A1 | 8/2009 | Takebe et al. |
| 2009/0232358 A1 | 9/2009 | Cross |
| 2009/0252437 A1 | 10/2009 | Li et al. |
| 2009/0316991 A1 | 12/2009 | Geva et al. |
| 2009/0317003 A1 | 12/2009 | Heilper et al. |
| 2010/0049711 A1 | 2/2010 | Singh et al. |
| 2010/0067826 A1 | 3/2010 | Honsinger et al. |
| 2010/0080462 A1 | 4/2010 | Miljanic et al. |
| 2010/0128131 A1 | 5/2010 | Tenchio et al. |
| 2010/0141788 A1 | 6/2010 | Hwang et al. |
| 2010/0144291 A1 | 6/2010 | Stylianou et al. |
| 2010/0172575 A1 | 7/2010 | Lukac et al. |
| 2010/0195933 A1 | 8/2010 | Nafarieh |
| 2010/0232697 A1* | 9/2010 | Mishima et al. ............ 382/168 |
| 2010/0239123 A1 | 9/2010 | Funayama et al. |
| 2010/0245870 A1 | 9/2010 | Shibata |
| 2010/0272361 A1 | 10/2010 | Khorsheed et al. |
| 2010/0296729 A1 | 11/2010 | Mossakowski |
| 2011/0052094 A1 | 3/2011 | Gao et al. |
| 2011/0081083 A1 | 4/2011 | Lee et al. |
| 2011/0188756 A1 | 8/2011 | Lee et al. |
| 2011/0215147 A1 | 9/2011 | Goncalves et al. |
| 2011/0222768 A1 | 9/2011 | Galic et al. |
| 2011/0249897 A1 | 10/2011 | Chaki et al. |
| 2011/0274354 A1 | 11/2011 | Nijemcevic |
| 2011/0280484 A1 | 11/2011 | Ma et al. |
| 2011/0285873 A1 | 11/2011 | Showering et al. |
| 2012/0051642 A1 | 3/2012 | Berrani et al. |
| 2012/0066213 A1 | 3/2012 | Ohguro |
| 2012/0092329 A1 | 4/2012 | Koo et al. |
| 2012/0114245 A1 | 5/2012 | Lakshmanan et al. |
| 2012/0155754 A1 | 6/2012 | Chen et al. |
| 2013/0001295 A1 | 1/2013 | Goncalves |
| 2013/0058575 A1 | 3/2013 | Koo et al. |
| 2013/0129216 A1 | 5/2013 | Tsai et al. |
| 2013/0194448 A1 | 8/2013 | Baheti et al. |
| 2013/0195315 A1 | 8/2013 | Baheti et al. |
| 2013/0195360 A1 | 8/2013 | Krishna Kumar et al. |
| 2013/0308860 A1 | 11/2013 | Mainali et al. |
| 2014/0003709 A1 | 1/2014 | Ranganathan et al. |
| 2014/0023270 A1 | 1/2014 | Baheti et al. |
| 2014/0023271 A1 | 1/2014 | Baheti et al. |
| 2014/0023273 A1 | 1/2014 | Bahetti et al. |
| 2014/0023274 A1 | 1/2014 | Barman et al. |
| 2014/0023275 A1 | 1/2014 | Krishna Kumar et al. |
| 2014/0168478 A1 | 6/2014 | Baheti et al. |

FOREIGN PATENT DOCUMENTS

| | | |
|---|---|---|
| EP | 2192527 A1 | 6/2010 |
| GB | 2453366 A | 4/2009 |
| GB | 2468589 A | 9/2010 |
| WO | 2004077358 A1 | 9/2004 |

OTHER PUBLICATIONS

Lowe, David G. "Distinctive image features from scale-invariant keypoints." International journal of computer vision 60.2 (2004): 91-110.*

Newell, Andrew J., and Lewis D. Griffin. "Multiscale histogram of oriented gradient descriptors for robust character recognition." Document Analysis and Recognition (ICDAR), 2011 International Conference on. IEEE, 2011.*

Papandreou, A. et al. "A Novel Skew Detection Technique Based on Vertical Projections", International Conference on Document Analysis and Recognition, Sep. 18, 2011, pp. 384-388, XP055062043, DOI: 10.1109/ICDAR.2011.85, ISBN: 978-1-45-771350-7.

Setlur, S. et al. "Creation of data resources and design of an evaluation test bed for Devanagari script recognition", Research Issues in Data Engineering: Multi-lingual Information Management, RIDE-MLIM 2003. Proceedings. 13th International Workshop, 2003, pp. 55-61.

Chaudhuri, B.B. et al. "Skew Angle Detection of Digitized Indian Script Documents", IEEE Transactions on Pattern Analysis and Machine Intelligence, vol. 19, No. 2, Feb. 1997, pp. 182-186.

Chen, X. et al. "Detecting and Reading Text in Natural Scenes," IEEE Computer Society Conference on Computer Vision and Pattern Recognition (CVRP'04), 2004, pp. 1-8.

Epshtein, B. et al. "Detecting text in natural scenes with stroke width transform," Computer Vision and Pattern Recognition (CVPR) 2010, pp. 1-8, (as downloaded from "http://research.microsoft.com/pubs/149305/1509.pdf").

Jain, A. K. et al. "Automatic text location in images and video frames", Pattern Recognition, vol. 31, No. 12, 1998, pp. 2055-2076.

Jayadevan, R. et al. "Offline Recognition of Devanagari Script: A Survey", IEEE Transactions on Systems, Man, and Cybernetics—Part C: Applications and Reviews, 2010, pp. 1-15.

(56) References Cited

OTHER PUBLICATIONS

Kapoor, R. et al. "Skew angle detection of a cursive handwritten Devanagari script character image", Indian Institute of Science, May-Aug. 2002, pp. 161-175.
Lee, S-W. et al. "A new methodology for gray-scale character segmentation and recognition," IEEE Transactions on Pattern Analysis and Machine Intelligence, vol. 18, No. 10, Oct. 1996, pp. 1045-1050.
Li, H. et al. "Automatic Text Detection and Tracking in a Digital Video", IEEE Transactions on Image Processing, vol. 9 No. 1, Jan. 2000, pp. 147-156.
Matas, et al. "Robust Wide Baseline Stereo from Maximally Stable Extremal Regions", Proc. of British Machine Vision Conference, 2002, pp. 384-393.
Mikulik, et al. "Construction of Precise Local Affine Frames," Center for Machine Perception, Czech Technical University in Prague, Czech Republic, Abstract and second paragraph of Section 1; Algorithms 1 & 2 of Section 2 and Section 4, International Conference on Pattern Recognition, 2010, pp. 1-5.
Pal, U. et al. "Indian script character recognition: a survey", Pattern Recognition Society, published by Elsevier Ltd, 2004, pp. 1887-1899.
"4.1 Points and patches" In: Szeliski Richard: "Computer Vision—Algorithms and Applications", 2011, Springer-Verlag, London, XP002696110, p. 195, ISBN: 978-1-84882-934-3.
Agrawal, M. et al. "Generalization of Hindi OCR Using Adaptive Segmentation and Font Files," V. Govindaraju, S. Setlur (eds.), Guide to OCR for Indic Scripts, Advances in Pattern Recognition, DOI 10.1007/978-1-84800-330-9_10, Springer-Verlag London Limited 2009, pp. 181-207.
Agrawal, M. et al. "2 Base Devanagari OCR System" In: Govindaraju V, Srirangataj S (Eds.): "Guide to OCR for Indic Scripts—Document Recognition and Retrieval", 2009, Springer Science+Business Media, London, XP002696109, pp. 184-193.
Chen, H. et al. "Robust Text Detection in Natural Images With Edge-Enhanced Maximally Stable Extremal Regions," believed to be published in IEEE International Conference on Image Processing (ICIP), Sep. 2011, pp. 1-4.
Chowdhury, A. R. et al. "Text Detection of Two Major Indian Scripts in Natural Scene Images", Sep. 22, 2011, Camera-Based Document Analysis and Recognition, Springer Berlin Heidelberg, pp. 42-57, XP019175802, ISBN: 978-3-642-29363-4.
Dlagnekov, L. et al. "Detecting and Reading Text in Natural Scenes," Oct. 2004, pp. 1-22.
Elgammal, A. M. et al. "Techniques for Language Identification for Hybrid Arabic-English Document Images," believed to be published in 2001 in Proceedings of IEEE 6th International Conference on Document Analysis and Recognition, pp. 1-5.
Ghoshal, R. et al. "Headline Based Text Extraction from Outdoor Images", 4TH International Conference on Pattern Recognition and Machine Intelligence, Springer LNCS, vol. 6744, Jun. 27, 2011, pp. 446-451, XP055060285.
Holmstrom, L. et al. "Neural and Statistical Classifiers—Taxonomy and Two Case Studies," IEEE Transactions on Neural Networks, Jan. 1997, pp. 5-17, vol. 8 (1).
Jain, A. K. et al. "Automatic Text Location in Images and Video Frames," believed to be published in Proceedings of Fourteenth International Conference on Pattern Recognition, vol. 2, Aug. 1998, pp. 1497-1499.
Machine Learning, retrieved from http://en.wikipedia.org/wiki/Machine_learning, May 7, 2012, pp. 1-8.
Moving Average, retrieved from http://en.wikipedia.org/wiki/Moving_average, Jan. 23, 2013, pp. 1-5.
Nister, D. et al. "Linear Time Maximally Stable Extremal Regions," ECCV, 2008, Part II, LNCS 5303, pp. 183-196, published by Springer-Verlag Berlin Heidelberg.
Pardo, M. et al. "Learning From Data: A Tutorial With Emphasis on Modern Pattern Recognition Methods," IEEE Sensors Journal, Jun. 2002, pp. 203-217, vol. 2 (3).
Park, J-M. et al. "Fast Connected Component Labeling Algorithm Using a Divide and Conquer Technique," believed to be published in Matrix (2000), vol. 4 (1), pp. 4-7, Publisher: Elsevier Ltd.
Renold, M. "Detecting and Reading Text in Natural Scenes," Master's Thesis, May 2008, pp. 1-59.
Shin, H. et al. "Application of Floyd-Warshall Labelling Technique: Identification of Connected Pixel Components in Binary Image," Kangweon-Kyungki Math. Jour. 14(2006), No. 1, pp. 47-55.
Vedaldi, A. "An Implementation of Multi-Dimensional Maximally Stable Extremal Regions" Feb. 7, 2007, pp. 1-7.
VLFeat—Tutorials—MSER, retrieved from http://www.vlfeat.org/overview/mser.html, Apr. 30, 2012, pp. 1-2.
Chen Y.L., "A knowledge-based approach for textual information extraction from mixed text/graphics complex document images", Systems man and Cybernetics (SMC), 2010 IEEE International Conference on, IEEE, Piscataway, NJ, USA, Oct. 10, 2010, pp. 3270-3277, XP031806156, ISBN: 978-1-4244-6586-6.
Co-pending U.S. Appl. No. 13/748,562, filed on Jan. 23, 2013, (47 pages).
Co-pending U.S. Appl. No. 13/831,237, filed on Mar. 14, 2013, (34 pages).
Co-pending U.S. Appl. No. 13/842,985, filed on Mar. 15, 2013, (53 pages).
Song Y., et al., "A Handwritten Character Extraction Algorithm for Multi-language Document Image", 2011 International Conference on Document Analysis and Recognition, Sep. 18, 2011, pp. 93-98, XP05568675, DOI: 10.1109/ICDAR.2011.28 ISBN: 978-1-45-771350-7.
Wu V., et al., "TextFinder: An Automatic System to Detect and Recognize Text in Images", IEEE Transactions on Pattern Analysis and Machine Intelligence, vol. 21, No. 11, Nov. 1, 1999, pp. 1224-1229, XP055068381.
"Histogram of oriented gradients," Wikipedia, retrieved from http://en.wikipedia.org/wiki/Histogram_of_oriented_gradients on Apr. 30, 2015, 7 pages.
"Connected-component labeling," Wikipedia, retrieved from http://en.wikipedia.org/wiki/Connected-component_labeling on May 14, 2012, 7 pages.
Lowe, D.G., "Distinctive Image Features from Scale-Invariant Keypoints," accepted for publication in the International Journal of Computer Vision, 2004, Jan. 5, 2004, 28 pages.
Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.
Chaudhuri B.B., et al., "An OCR system to read two Indian language scripts: Bangla and Devnagari (Hindi)", Proceedings of the 4TH International Conference on Document Analysis and Recognition. (ICDAR). Ulm, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.
Chaudhury S (Eds.): "OCR Technical Report for the project Development of Robust Document Analysis and Recognition SYstem for Printed Indian Scripts", 2008, pp. 149-153, Retrieved from the Internet: URL:http://researchweb.iiit.ac.inj-jinesh/ocrDesignDoc.pdf [retrieved on Sep. 5, 2013].
Dalal N., et al., "Histograms of oriented gradients for human detection", Computer Vision and Pattern Recognition, 2005 IEEE Computer Society Conference on, IEEE, Piscataway, NJ, USA, Jun. 25, 2005, pp. 886-893 vol. 1, XP031330347, ISBN: 978-0-7695-2372-9 Section 6.3.
Forsesen P.E., et al., "Shape Descriptor for Maximally Stable Extremal Regions", Computer Vision, 2007. ICCV 2007. IEEE 11th International Conference on, IEEE, Pl, Oct. 1, 2007, pp. 1-8, XP031194514 , ISBN: 978-1-4244-1630-1 abstract Section 2. Multi-resoltuion MSER.
International Search Report and Written Opinion—PCT/US2013-049379—ISA/EPO—Oct. 17, 2013.
Minoru M., Ed., "Character Recognition", Aug. 2010, Sciyo, XP002715748, ISBN: 978-953-307-105-3 pp. 91-95, p. 92, section "7.3 Baseline Detection Process".

(56) References Cited

OTHER PUBLICATIONS

Pal U et al., "Multi-skew detection of Indian script documents" Document Analysis and Recognition, 2001. Proceedings. Sixth International Conference on Seattle, WA, USA Sep. 10-13, 2001, Los Aalmitos, CA, USA, IEEE Comput. Soc. US, Sep. 10, 2001, pp. 292-296, XP010560519, DOI:10.1109/ICDAR.2001.953801, ISBN: 978-0-7695-1263-1.

Pal U., et al., "OCR in Bangla: an Indo-Bangladeshi language", Pattern Recognition, 1994. vol. 2—Conference B: Computer Vision & Image Processing., Proceedings of the 12th IAPR International. Conferenc e on Jerusalem, Israel Oct. 9-13, 1994, Los Alamitos, CA, USA, IEEE ICPR.1994.576917 ISBN: 978-0-8186-6270-6 the whole document.

Premaratne H.L., et al., "Lexicon and hidden Markov model-based optimisation of the recognised Sinhala script", Pattern Recognition Letters, Elsevier, Amsterdam, NL, vol. 27, No. 6, Apr. 15, 2006, pp. 696-705, XP027922538, ISSN: 0167-8655.

Ray A.K et al., "Information Technology—Principles and Applications". 2004. Prentice-Hall of India Private Limited. New Delhi! XP002712579, ISBN: 81-203-2184-7, pp. 529-531.

Senda S., et al., "Fast String Searching in a Character Lattice," IEICE Transactions on Information and Systems, Information & Systems Society, Tokyo, JP, vol. E77-D, No. 7, Jul. 1, 1994, pp. 846-851, XP000445299, ISSN: 0916-8532.

Senk V., et al., "A new bidirectional algorithm for decoding trellis codes," EUROCON' 2001, Trends in Communications, International Conference on Jul. 4-7, 2001, Piscataway, NJ, USA, IEEE, Jul. 4, 2001, pp. 34-36, vol. 1, XP032155513, DOI :10.1109/EURCON.2001.937757 ISBN : 978-0-7803-6490-5.

Sinha R.M.K., et al., "On Devanagari document processing", Systems, Man and Cybernetics, 1995. Intelligent Systems for the 21st Century., IEEE International Conference on Vancouver, BC, Canada Oct. 22-25, 1995, New York, NY, USA,IEEE, US, vol. 2, Oct. 22, 1995, pp. 1621-1626, XP010194509, DOI: 10.1109/ICSMC.1995.538004 ISBN: 978-0-7803-2559-3 the whole document.

Uchida S et al., "Skew Estimation by Instances", 2008 The Eigth IAPR International Workshop on Document Analysis Systems, Sep. 1, 2008, pp. 201-208, XP055078375, DOI: 10.1109/DAS.2008.22, ISBN: 978-0-76-953337-7.

Unser M., "Sum and Difference Histograms for Textue Classification", Transactions on Pattern Analysis and Machine Intelligence, IEEE, Piscataway, USA, vol. 30, No. 1, Jan. 1, 1986, pp. 118-125, XP011242912, ISSN: 0162-8828 section A; p. 122, right-hand column p. 123.

* cited by examiner

Key:
1 = white
0 = black

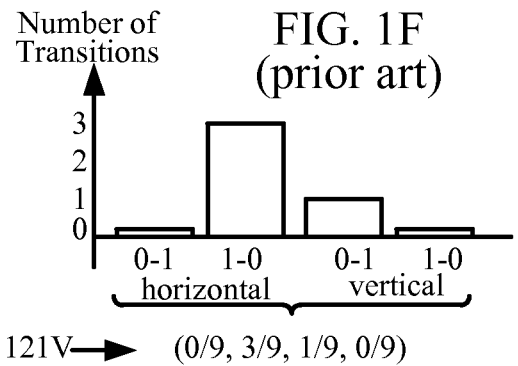
FIG. 1F (prior art)
121V → (0/9, 3/9, 1/9, 0/9)
FIG. 1G (prior art)
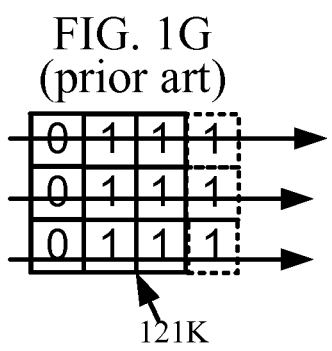
FIG. 1H (prior art)
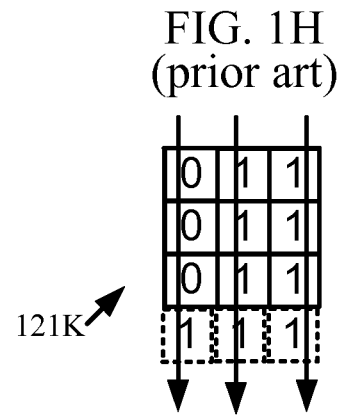
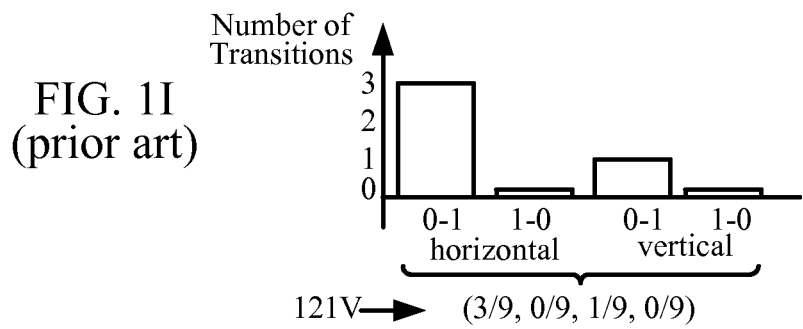
FIG. 1I (prior art)
121V → (3/9, 0/9, 1/9, 0/9)

191N

191W

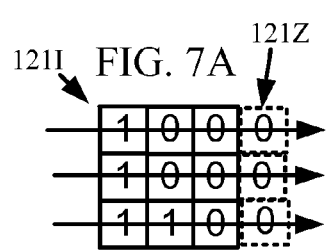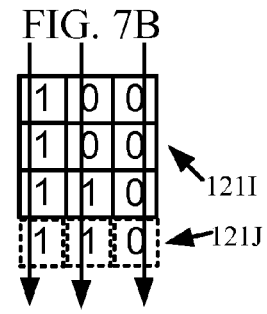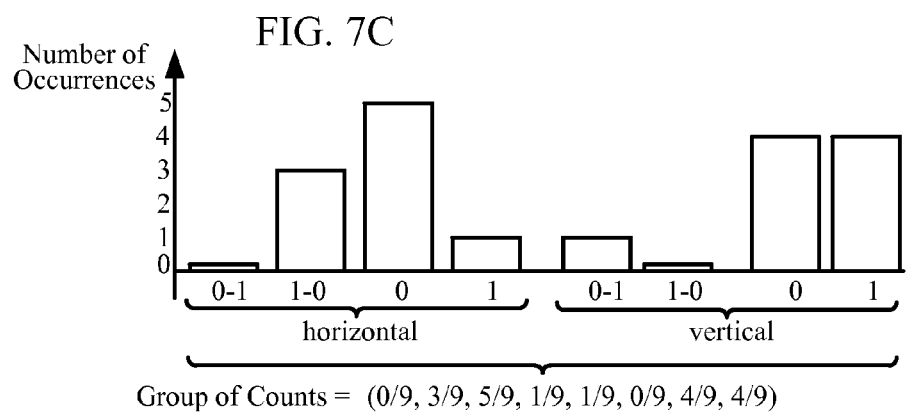

FEATURE EXTRACTION AND USE WITH A PROBABILITY DENSITY FUNCTION (PDF) DIVERGENCE METRIC

CROSS-REFERENCE TO PROVISIONAL APPLICATION

This application claims priority under 35 USC §119 (e) from U.S. Provisional Application No. 61/673,677 filed on Jul. 19, 2012 and entitled "Feature Extraction And Use With A Probability Density Function (PDF) Divergence Metric", which is incorporated herein by reference in its entirety.

FIELD

This patent application relates to apparatuses and methods that process an image from a camera of a mobile device, to identify symbols therein.

BACKGROUND

Handheld devices and mobile devices such as a cell phone 108 (FIG. 1A) include a digital camera for use by a person 110 with their hands to capture an image of a real world scene 100, such as image 107, shown displayed on a screen 106 in FIG. 1A. Image 107 is also referred to as a handheld camera captured image, or a natural image or a real world image, to distinguish it from an image formed by an optical scanner from a document that is printed on paper (e.g. scanned by a flatbed scanner of a photocopier).

Recognition of text in image 107 (FIG. 1A) may be based on identification of regions (also called "blobs") that differ from surrounding pixels in one or more properties, such as intensity and/or color. Several such regions are identified in the prior art as maximally stable extremal regions or MSERs. MSERs may be used as connected components, which may be subject to on one or more geometric tests, to identify a rectangular portion 103 of image 107 (FIG. 1A) which includes such a region, as a candidate to be recognized as a character of text. The rectangular portion 103 may be sliced or segmented into one or more blocks, such as block 121 (FIG. 1B) that is a candidate for recognition, as a character of text.

Block 121 which is to be subject to recognition may be formed to fit tightly around an MSER (e.g. so that each of four sides of the block touch a boundary of the region). In some examples a rectangular portion 103 (FIG. 1J) in an image is first divided into a top strip 191, a header line (also called "shiro-rekha") 192, and a bottom strip 193, to extract therefrom a core strip 194. A region in core strip 194 may be then divided into one or more blocks in contact with one another, such as block 121, based on one or more tests that may indicate presence of multiple characters that form a word of text. The tests to obtain a block 121 for recognition from image 107 may be based on use of one or more properties of a predetermined script in which text to be recognized is printed, e.g. as described in an article entitled "Indian script character recognition: a survey" by U. Pal and B. B Choudhuri, Pattern Recognition 37(9): 1887-1899 (2004), or as described in another article entitled "Offline Recognition of Devanagari Script: A Survey" by R. Jayadevan, Satish R. Kolhe, Pradeep M. Patil, and Umapada Pal, IEEE Transactions on Systems, Man, and Cybernetics, Part C: Applications and Reviews, November 2010, each of which is incorporated by reference herein in its entirety.

A block 121 that is a candidate for recognition may be further divided up, by use of a predetermined grid (FIG. 1B), into unitary sub-blocks 121A-121Z (wherein $A \leq I \leq Z$, Z being the number of sub-blocks, e.g. 20), each sub-block 121I (FIG. 1C) containing N pixels with one of two binary values, namely value 0 or value 1.

Optical character recognition (OCR) methods of the prior art originate in the field of document processing, wherein a document's image obtained by use of a flatbed scanner contains a series of lines of text (e.g. 20 lines of text). Such prior art OCR methods may extract a vector (called "feature vector") from binary values of pixels in each sub-block 121I. Feature vectors Z in number are sometimes obtained for a block 121 that is subdivided into Z sub-blocks, and these Z vectors may be stacked to form a block-level vector that represents the entirety of block 121, and it is this block-level vector that is then compared with a library of reference vectors generated ahead of time (based on training images of letters of an alphabet to be recognized). Next, a letter of an alphabet which is represented by a reference vector in the library that most closely matches the vector of block 121 is identified as recognized, so as to conclude the OCR ("document" OCR) of a character in block 121 in portion 103 of a document's image.

One feature vector of such prior art has four dimensions, each dimension representing a gradient, based on a count of transitions in intensity, between the two binary values along a row or a column in a sub-block. Specifically, two dimensions in the feature vector keep count of black-to-white and white-to-black transitions in the horizontal direction (e.g. left to right) along a row of pixels in the sub-block, and two additional dimensions in the feature vector keep count of black-to-white and white-to-black transitions in the vertical direction (e.g. bottom to top) along a column of the sub-block. Exactly four counts are formed. In forming the four counts, block 121 is assumed to be surrounded by a white boundary, and any transition at the boundary is counted as a half transition. These four counts are divided by total number of pixels N in each sub-block, even though the sum of these four counts does not add up to N.

In the example shown in FIG. 1B, block 121 is subdivided into twenty (Z=20) sub-blocks, and each sub-block has its own vector of four dimensions. For example, traversing pixels in a horizontal direction from left to right (see sub-block 121I of FIGS. 1C and 1D) yields two values: zero (0) zero-to-one transitions, and three (3) one-to-zero transitions (assuming a column 121Z of zero intensity pixels at the right boundary of sub-block 121I). Traversing pixels in a vertical direction from bottom to top (see sub-block 121I in FIG. 1E) yields the following values: one (1) zero-to-one transition and a zero (0) one-to-zero transition (assuming a row 121J of (1, 1, 0) intensity pixels at the bottom boundary of sub-block 121I).

Hence, a histogram of the above-described intensity transitions in sub-block 121I has the following four values (0, 3, 1, 0), as shown in FIG. 1F, wherein the first two values are generated by horizontal traversal and the last two values are generated by vertical traversal. As there are N=9 pixels in sub-block 121I of this example, a vector 121V is formed (see FIG. 1F) by dividing the counts with this number N, as follows: (0/9, 3/9, 1/9, 0/9). Formation of a similar four element vector for sub-block 121K is illustrated in FIGS. 1G, 1H and 1I. Similar four element vectors are formed for all remaining sub-blocks, and then the vectors for all sub-blocks are stacked (or concatenated) to form a block-level vector for the entirety of block 121, which therefore has a total of 4×Z e.g. 80 elements (also called "dimensions"). This 80 element vector for block 121 may then be used, in comparison with reference vectors in a library, to identify a letter of text therein.

In some prior art methods, an 80 dimension vector of the type described above is compared with reference vectors (each of which also has 80 dimensions) in the library, by use of a Euclidean distance metric (square root of squares of difference in each dimension), or a simplified version thereof (e.g. sum of absolute value of difference in each dimension). One issue that the current inventors find in use of such distance metrics to identify characters is that the above-described division by N, which is used to generate a four dimensional vector 121V as described above, affects accuracy because the sum of the four elements prior to division by N does not add up to N (and, in the example shown in FIGS. 1C-1F, the sum 0+3+1+0 is 4, which is not same as 9).

Moreover, the current inventors note that ambiguity can arise in use of four counts to represent nine pixels, which can increase the difficulty in recognizing (from a handheld camera captured image), letters of an alphabet whose rules permit ambiguity, such as Devanagari wherein, for example, a left half portion of a letter can be combined with another letter, and/or a letter may or may not have an accent mark at the bottom or the top of that letter, etc. Furthermore, the current inventors note that use of just four counts may be insufficient to represent details necessary to uniquely characterize regions of text, in certain scripts such as Devanagari that have a large number of characters in their alphabet. Therefore, the current inventors believe that use of an 80 element feature vector (obtained by cascading groups of 4 counts for 20 sub-blocks) can result in false positives and/or negatives that render prior art techniques impractical.

Hence, the current inventors believe there is a need for a new vector that is more representative of pixels in the image, and use of the new vector with a new comparison measure that provides a better match to a reference vector in a library, as described below.

SUMMARY

In several embodiments, an image of real world (or a frame of video, also called image) is processed to identify one or more portions therein, for use as candidates to be compared with a set of symbols that have predetermined shapes (also called "reference symbols"), such as logos, traffic signs, and/or letters of a predetermined alphabet or script such as Devanagari. Each such image portion is traversed to generate counts in a group of counts. The group of counts has a predetermined size, e.g. 6 counts or 8 counts. Each count in the group indicates either that there is a change of at least a predetermined amount between intensity values of two pixels (in a given direction of traversal) or that the change in intensity values of two pixels (in the given direction) is smaller than the predetermined amount (e.g. change may be absent or zero, when binary values of pixel intensities are identical). Hence, each pixel in an image portion contributes to at least one of the counts. Moreover, the group of counts does not encode positions at which the changes occur in the image (so the group of counts results in a lossy compression).

Depending on the embodiment, the counts in such a group may be normalized, e.g. based on a number of pixels in the image portion (and in embodiments that traverse the image portion in multiple directions, also based on the number of directions of traversal), so that the sum of the counts becomes 1. One or more vector(s) based on such counts may be compared with multiple predetermined vectors of reference symbols (e.g. letters of an alphabet), using any measure of difference between probability distributions, such as the Jensen-Shannon divergence metric. Whichever reference symbol (e.g. letter of the alphabet) has a predetermined vector that most closely matches the vector(s) for the image portion is thereby identified and stored in memory, as being recognized to be present in the image.

It is to be understood that several other aspects of the described embodiments will become readily apparent to those skilled in the art from the description herein, wherein it is shown and described various aspects by way of illustration. The drawings and detailed description are to be regarded as illustrative in nature.

BRIEF DESCRIPTION OF THE DRAWINGS

FIG. 1F illustrates, in a histogram, four counts that are generated by traversals of sub-block 121I in the two directions of FIGS. 1D and 1E in the prior art.

FIGS. 1G and 1H illustrate two directions of traversal of sub-block 121K of FIG. 1B.

FIG. 1I illustrates, in a histogram, four counts that are generated by traversals of sub-block 121K in the two directions of FIGS. 1G and 1H in the prior art.

FIGS. 7A and 7B illustrate two directions of traversal of sub-block 121I of FIGS. 1B and 1C to generate counts of occurrences of change in value and no change in value in some described embodiments.

FIG. 7C illustrates six counts that are generated in some embodiments on completion of the traversals in the two directions illustrated in FIGS. 7A and 7B.

DETAILED DESCRIPTION

In several aspects of the described embodiments, one or more portions of a natural image (also called "handheld camera captured image") of a scene of a real world are received in an act 201 (FIG. 2), e.g. from a camera of a mobile device (such as a handheld device), as candidates to be recognized from among a set of symbols (also called "reference symbols"). Symbols in such a set have predetermined shapes that are designed by humans, and hence different from naturally-occurring shapes. Examples of such symbols include logos of organizations (e.g. five interlocking circles that represents Olympics), traffic signs (such as an exclamation mark within a triangle that represents a danger sign), or letters of an alphabet (e.g. letters of text in English language and/or in Hindi language written in Devanagari).

Figure 1A:
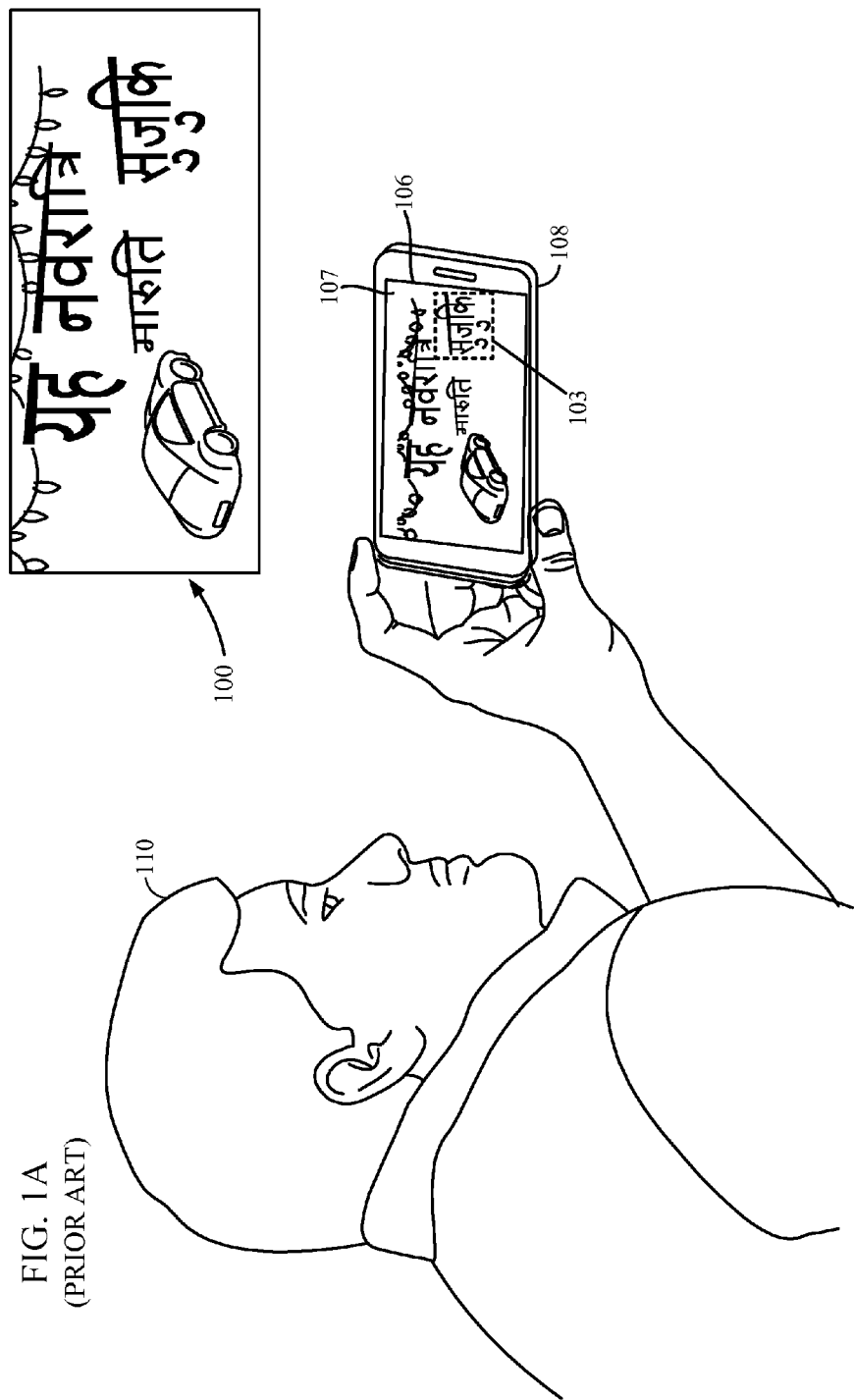
FIG. 1A illustrates a user using a camera-equipped mobile device of the prior art to capture an image of a bill-board in the real world.
Figure 1B:
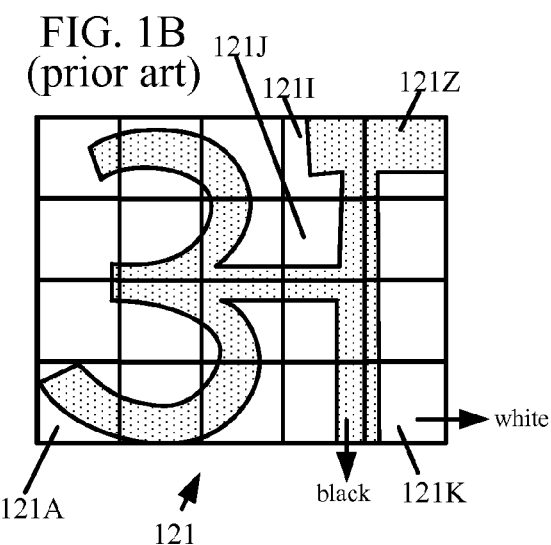
FIG. 1B illustrates a block 121 in the image of FIG. 1A being subdivided in the prior art into sub-blocks 121A-121Z.
Figure 1C:
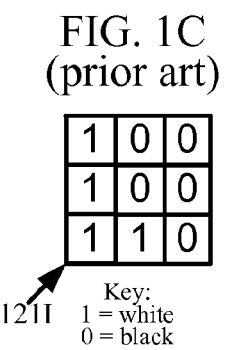
FIG. 1C illustrates pixels in a sub-block 121I of FIG. 1B.
Figure 1D:
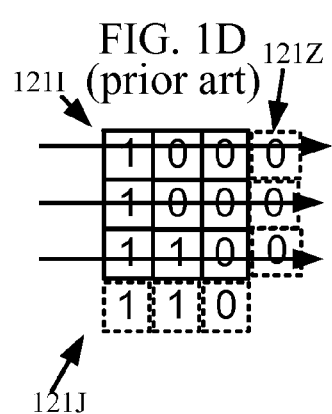
FIGS. 1D and 1E illustrate two directions of traversal of sub-block 121I of FIGS. 1B and 1C.
Figure 1E:
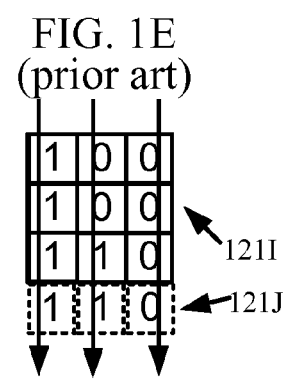
Figure 1J:
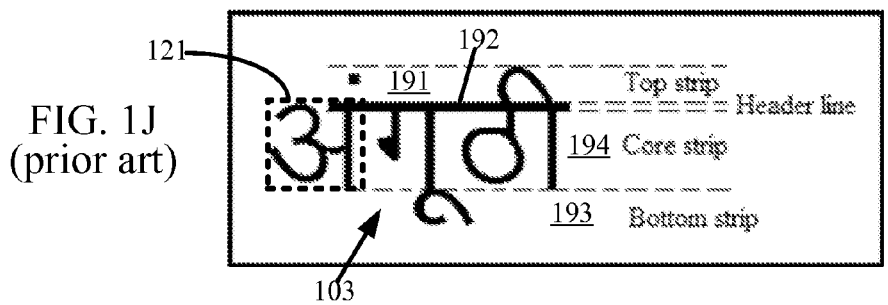
FIG. 1J illustrates a rectangular portion 103 in the image of FIG. 1A divided into strips 191, 194, 193, and shiro-rekha 192, followed by identification of a block 121.

In some embodiments, the image portions received in act 201 are blocks that are rectangular in shape, identified from a rectangular portion 103 (FIG. 1A) of the image 107, e.g. by forming a rectangular boundary around a group of pixels of a region (e.g. a connected component) in the image that satisfy a predetermined test, e.g. see block 121 of FIG. 1B and FIG. 1J. Hence, in some embodiments, the just-described region is a maximally stable extremal region (MSER), and the block 121 is formed by identifying a rectangle to fit the region, as described in the background section above. Such a block 121 may be identified by application of any known method to image the rectangular portion 103, for use as a candidate to be recognized from among a set of symbols.

In one illustrative example, a predetermined test to detect pixels that form a header line or shiro-rekha 192 (FIG. 1J) may be used to identify block 121, as likely to contain a character written in Devanagari script. As would be apparent to a person skilled in the language Hindi, shiro-rekha 192 is normally used to connect tops of characters of a word in Devanagari. For this reason, a test that detects the shiro-rekha 192 may be used to identify block 121 from an image 107. Therefore, some tests check whether or not blocks in an image region have pixels of a common binary value (e.g. value 1 or value 0 in a binarized version of the image) arranged along a straight line oriented in a longitudinal direction of the region. One example of such a test checks whether a histogram of pixel intensities has a peak with predetermined properties (e.g. peak's location, relative to the height of the block 121, e.g. peak within top $\frac{1}{3}^{rd}$ of block 121) which may indicate presence of a line of pixels oriented in a longitudinal direction relative to block 121. Such a test may optionally also check for presence of a line of pixels in one or more blocks that are adjacent to block 121, in the same longitudinal direction. A specific manner in which act 201 is performed, to receive a block 121 to be recognized, can be different in different embodiments, depending, for example on the set of symbols (e.g. letters in a human language of written text) to be compared with the received block 121.

Figure 3A:
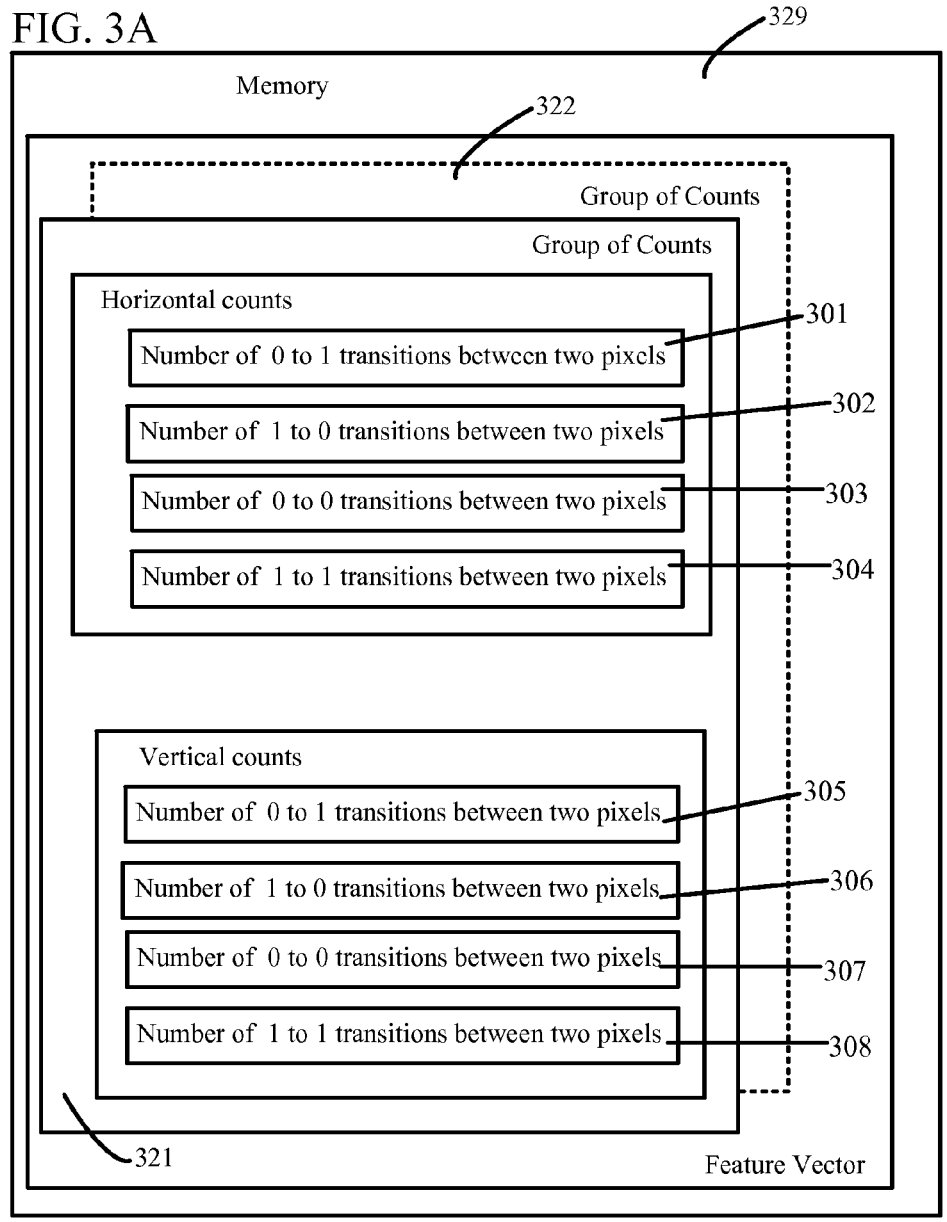
FIG. 3A illustrates, in a memory of several described embodiments, eight counts (also called counters) that are incremented during traversal of a portion of the image, in two directions, namely four horizontal counters and four vertical counters.

In act 202 of several embodiments, an image portion (e.g. block 121) which is received in act 201 is traversed (e.g. by one or more processors in a mobile device 401, such as a smart phone), to identify changes in intensity of pixels in the image. Then in act 203, the intensity changes are used (e.g. by one or more processors) to generate a group of counts for the image portion, such as group 321 in FIG. 3A. The group of counts is of a size that is predetermined. In the example of FIG. 3A, the group has exactly 8 counts, of which four counts 301-304 are generated by traversal in the horizontal direction and four counts 305-308 are generated by traversal in the vertical direction. In another example shown in FIG. 5B, a group has exactly 6 counts, of which three counts 301, 302 and 309 are generated by traversal in the horizontal direction and three counts 305, 306 and 310 are generated by traversal in the vertical direction.

Regardless of a specific size that is predetermined for a group, an intensity of each pixel in the portion of the image is used in act 203 (e.g. by one or more processors) to generate at least one count in the group, by checking (as per act 203A in FIG. 2A) whether a change in intensity (which may be either a grayscale value, or a binary value) between two pixels that are adjacent (in a direction of traversal), exceeds a threshold for the change. The threshold is predetermined, e.g. 0 when the intensity values being compared are binary values, or e.g. 100 when the intensity values are grayscale values in a predetermined range between 0 and 255.

Specifically, in act 203B, a count ("first count") is incremented when an intensity change, in traversing from a current pixel to a next pixel, exceeds the predetermined threshold. An intensity change in grayscale values may exceed the threshold of 100, for example, when the current pixel is at grayscale value 10 and the next pixel is at grayscale value 120. Similarly, an intensity change in binary values may exceed the threshold of 0, for example, when the current pixel is of binary value 0 and the next pixel is of binary value 1.

When the intensity change does not exceed the predetermined threshold, act 203C may be performed to increment another count ("second count"), when the intensity change is positive. When the intensity change is not positive, yet another count in the group may be incremented as per act 203D. The intensity change is negative, for example, when the current pixel is of grayscale value 255 and the next pixel is of grayscale value 0 (with intensity change being positive when the values are the opposite, e.g. current pixel is of grayscale value 0 and the next pixel is of grayscale value 255).

After any count in the group is incremented (e.g. by one or more processors), act 204 is performed, to check if all pixels in the image portion have been traversed and if not, the one or more processors loop back to act 202 (described above). When all pixels in the image portion have been traversed, the one or more processors of some aspects perform act 205, to recognize a symbol (e.g. a character in Devanagari script), as follows. Specifically, act 205 compares a vector (also called "feature" vector) that is automatically derived based on at least the group of counts, with predetermined vectors for corresponding symbols in a set, to identify a specific symbol, and the specific symbol 354 identified is then stored in one or more memories 329 (FIG. 6), as being recognized in the image.

Note that act 205 uses a measure of difference, between two probability distributions, to perform the comparison in several embodiments. In order to use such a measure, the above-described feature vector is obtained in some embodiments by dividing each count in a group by N to obtain an element of the vector, wherein N is the number of pixels in the image portion. In several embodiments, the elements in a feature vector are fractions that when added up to one another, sum to the value 1 (e.g. after rounding up). A feature vector of the type described above, with elements that add to 1, enables comparison of such a vector with other similarly-generated vectors (whose elements also add up to 1), by use of a measure of difference between probability distributions, such as Jensen-Shannon divergence or any other metric of divergence. The measure that is used to compare vectors of the type described above may or may not be symmetric, depending on the embodiment.

The above-described method illustrated in FIG. 2A may be performed either on a block 121 in its entirety or on a sub-block within block 121, as described below in reference to FIG. 2B. Specifically, in act 211 of several embodiments, a block 121 that is received in act 201 is subdivided (e.g. by one or more processors in a mobile device 401, such as a smart phone) into sub-blocks in some embodiments (e.g. to form Z sub-blocks, with Z being 9 or 16 for example). Each sub-block that is generated by act 211 in such embodiments has multiple rows and multiple columns, e.g. 3 rows and 3 columns, similar or identical to sub-block 121I illustrated in FIG. 1C.

Then, in act 212 (FIG. 2B) of several embodiments, each sub-block is traversed (by the one or more processors of mobile device 401) to generate a predetermined number of counts (e.g. six counts or eight counts) in a group for the sub-block. The directions of traversal of a sub-block in act 212 may be similar to the directions illustrated in FIG. 1D (from left to right in each row, starting from a bottom row and ending in a top row) and illustrated in FIG. 1E (from bottom to top in each column, starting from a left column and ending in a right column).

Independent of how each sub-block is traversed, each count in the group identifies either a number of times that changes in intensity (of pixels adjacent to one another in the sub-block) are sufficiently large to exceed a threshold (also referred to as a "gradient count"), or a number of times that the intensity changes are sufficiently small (below the threshold) to be treated as absent (also referred to as a "constant count"). Both kinds of the just-described counts (namely at least one gradient count and at least one constant count) are maintained in each group for each sub-block in some embodiments of the type described herein, thereby to ensure that a sum of counts (for a sub-group in each traversal direction respectively) is equal to a number of pixels in each sub-block.

Note that the counts being generated in act 212 as described above do not encode positions in a sub-block (e.g. a specific row among the multiple rows and a specific column among the multiple columns), at which changes in pixel intensity occur in the sub-block. Hence, such counts indicate the frequency of intensity changes at sub-block level not at pixel level (so, these counts are common across all pixels in a sub-block). So, counts generated in act 212 ("sub-block level counts") are insufficient to re-construct a specific intensity value of any specific pixel in a sub-block. Therefore, generation of counts in act 212 may be conceptually thought of as averaging across pixel positions in the two dimensions of a sub-block, thereby performing a "lossy" compression of pixel intensities in the sub-block (in contrast to "lossless" compression, encoding information sufficient to re-construct intensity of each pixel in a sub-block).

Figure 3B:
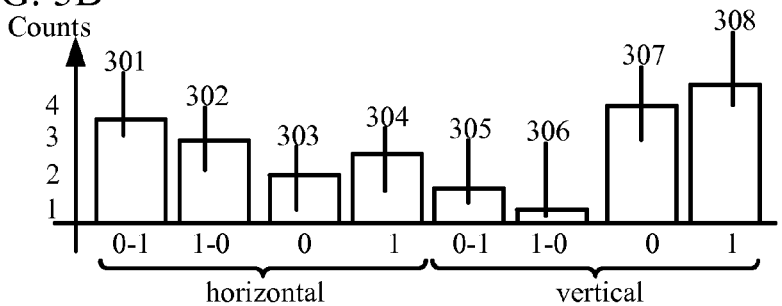
FIG. 3B illustrates, in a histogram of several described embodiments, example values of the eight counts of FIG. 3A.

Referring to the sub-block 121I shown in FIG. 1C, performance of such an act 212 in some embodiments results in two gradient counts 301, 302 and two constant counts 303, 304 for the horizontal direction of traversal and two gradient counts 305, 306 and two constant counts 307, 308 for the vertical direction of traversal. Hence, an initial performance of act 212 of some embodiments generates the following four values in the horizontal direction (as shown in FIG. 3B): zero (0) white-to-black changes in intensity for a horizontal gradient count 301, three (3) black-to-white changes in intensity for another horizontal gradient count 302, five (5) pixel locations with no changes occurring in white intensity for a horizontal constant count 303, and one (1) pixel location with no changes occurring in black intensity for another horizontal constant count 304.

Note that the sum of these four values (described in the preceding paragraph) is 0+3+5+1 which is 9, identical to the number of pixels in sub-block 121I. Hence, a contribution of each pixel in a sub-block is being automatically included by act 212 (FIG. 2B) in at least one count among the four counts (e.g. grouped into a sub-group) that are generated for the horizontal direction, either in one of the two gradient counts if there is an intensity change (also called intensity transition) occurring, or in one of the two constant counts if there is no change in intensity occurring. Hence, in some embodiments, the four values are divided by the number of pixels N to obtain normalized counts, as per act 213 (FIG. 2B).

Some embodiments perform traversals in more than one direction, and hence act 214 (FIG. 2B) checks if all traversals have been performed on sub-block 121I in all directions and if not, act 212 (FIG. 2B) is again performed to additionally generate another four counts (e.g. grouped into another sub-group), namely two gradient counts and two constant counts for the vertical direction. For the example of sub-block 121I shown in FIG. 1C, performance of act 202 for the vertical direction generates the following four values: one (1) white-to-black intensity transitions for a vertical gradient count 305, zero (0) black-to-white intensity transitions for another vertical gradient count 306, four (4) pixel locations with no transition occurring in white intensity for a vertical constant count 307, and four (4) pixel locations with no transition occurring in black intensity for another vertical constant count 308. Note that the sum of these four values is 1+0+4+4 which is 9, again identical to the number of pixels in sub-block 121I. So, in the vertical direction of traversal as well, a contribution of each pixel in a sub-block is being automatically included by act 202 in at least one count among the four counts generated (in the sub-group corresponding to the vertical direction).

In some embodiments that perform two traversals in act 212 of sub-block 121I, e.g. in the horizontal and vertical directions, a group of eight counts 301-308 (FIG. 3B) are generated, to have the following eight values (0, 3, 5, 1, 1, 0, 4, 4). Accordingly, the just-described eight counts 301-308 (FIG. 3B) are normalized to obtain a vector in act 213 of some embodiments by division with N. Therefore, a vector that is representative of sub-block 121I is formed from such a group of counts in some embodiments by dividing the 4*S or eight normalized counts (wherein S is the number of directions of traversal) by the number of pixels N, e.g. the eight values (0/9, 3/9, 5/9, 1/9, 1/9, 0/9, 4/9, 4/9). Such a vector is also referred to below as a 4S vector. The sum of the normalized counts of the 4S vector for a sub-block adds up to value 1, which enables 4S vectors of the described embodiments to be used (in act 216, described in detail below) in a metric of divergence for probability density functions (PDFs) which add to value 1. So, the just described normalized counts of a vector of some embodiments are indicative of probabilities of encountering or not encountering transitions in pixel intensities, during traversal of each sub-block in each of the multiple directions.

Figure 7D:
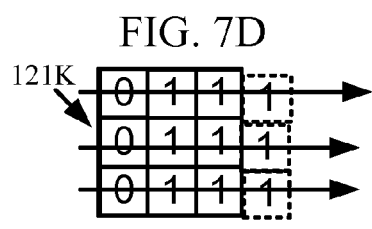
FIGS. 7D and 7E illustrate two directions of traversal of sub-block 121K of FIG. 1B to generate counts of occurrences of change in value and no change in value in some described embodiments.
Figure 7E:
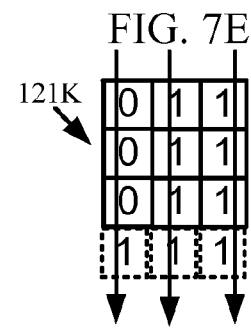
Figure 7F:
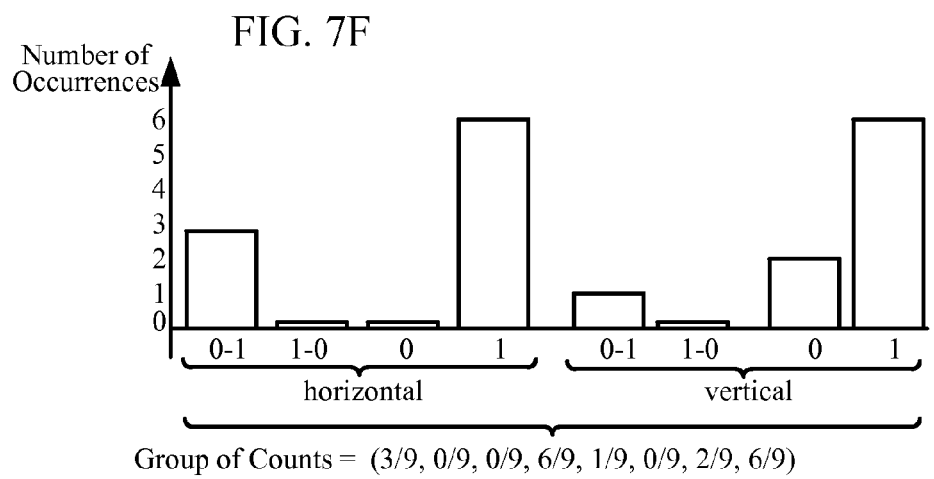
FIG. 7F illustrates six counts that are generated in some described embodiments on completion of the traversals in the two directions illustrated in FIGS. 7D and 7E.

FIGS. 7A and 7B illustrate two directions of traversal of sub-block 121I of FIGS. 1B and 1C to generate four counts of occurrences of change in value and four counts of no change in value in some described embodiments, to generate 4S vectors of the type described above. FIG. 7C illustrates eight counts that are generated in some embodiments on completion of the traversals in the two directions illustrated in FIGS. 7A and 7B. FIGS. 7D and 7E illustrate two directions of traversal of sub-block 121K of FIG. 1B to generate four counts of occurrences of change in value and four counts of no change in value in some described embodiments. FIG. 7F illustrates eight counts that are generated in some described embodiments on completion of the traversals in the two directions illustrated in FIGS. 7D and 7E.

Figure 2A:
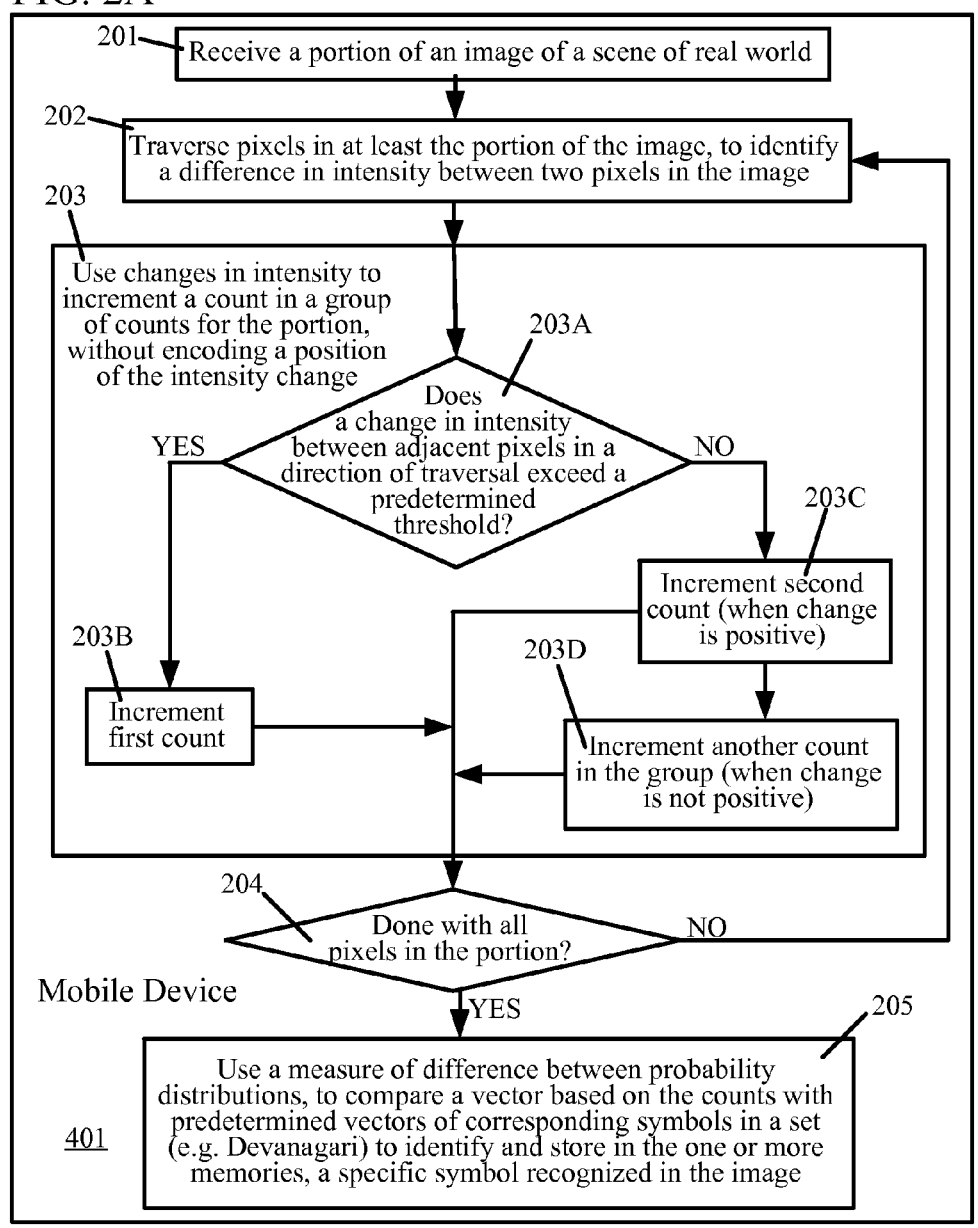
FIG. 2A illustrates, in a flow chart, acts performed in some described embodiments, to generate counts used to prepare a vector representative of a portion of an image and comparison of the vector with predetermined vectors to identify a specific symbol.
Figure 2B:
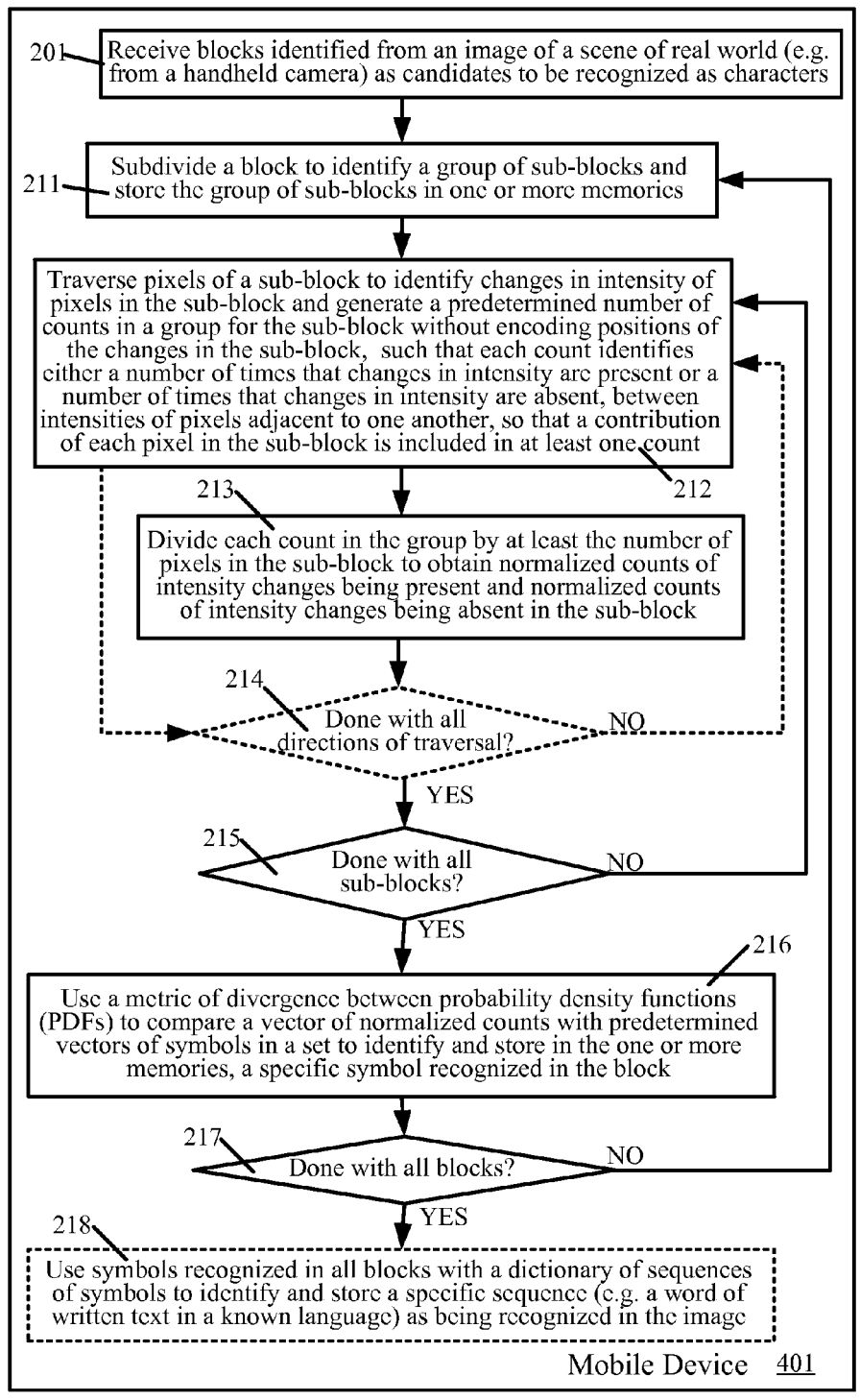
FIG. 2B illustrates, in another flow chart, acts performed in several described embodiments, to generate counts used to prepare a vector representative of a sub-block in a block in an image.

In the method of FIG. 2B, when act 214 indicates that act 212 has been performed for all directions of traversal, an act 215 is performed to check if 4S vectors have been created for all sub-blocks of a block and if not, acts 212 and 213 are performed repeatedly with another sub-block to obtain additional normalized counts (of both types namely gradient counts and constant counts), until all sub-blocks of a block have been traversed. After act 215 indicates that all sub-blocks have been traversed, then in an act 216 a vector for the block is/are prepared (e.g. by stacking or appending) the multiple 4S vectors (or groups of counts), and then the block's vector is compared with predetermined vectors of corresponding symbols in a set, to identify a specific symbol in the set as being recognized in the block. The multiple 4S vectors or groups of counts are appended in a predetermined order to form the vector for the block, e.g. the in the predetermined order in which the sub-blocks are obtained, on dividing the block.

Figure 6:
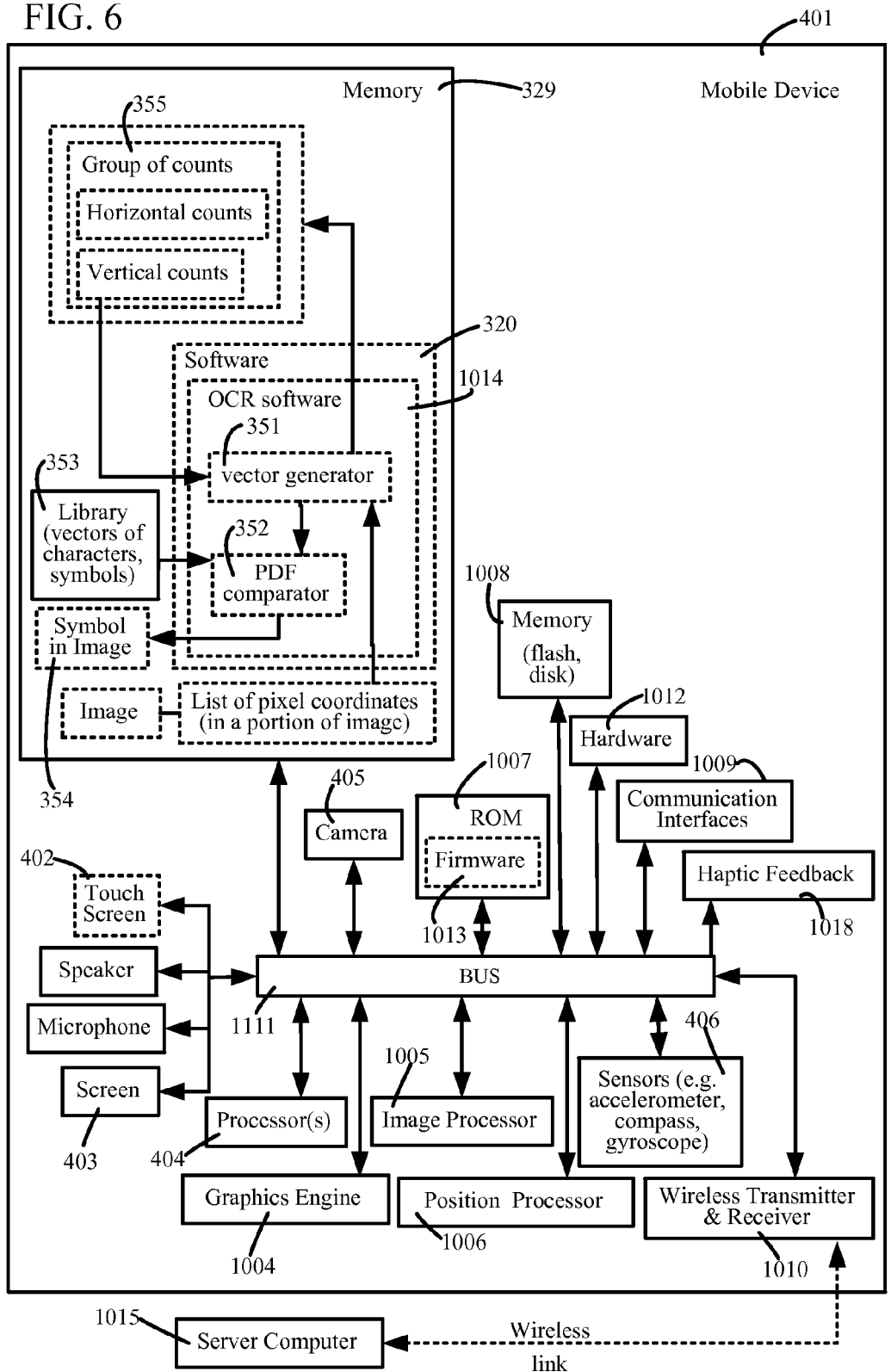
FIG. 6 illustrates, in a high-level block diagram, various components of a mobile device (e.g. a handheld device) in some of the described embodiments.

Depending on the embodiment, the elements of vectors of each sub-block may be divided by the number of sub-blocks Z in each block, so that the results when used as elements of a block-level vector, add up to 1. Next, in act 217, one or more processors of mobile device 401 check whether all blocks received in act 201 have been processed and if not return to act 211 (described above). When the result of act 217 is that symbols in all blocks have been recognized, then the symbols that have just been recognized by act 216 may be displayed on a screen, such as screen 403 or 402 (FIG. 6). In some embodiments, the symbols recognized in act 216 are optionally subject to correction in act 218 by use of a dictionary of sequences of symbols (such as words of text), to identify and store in memory a specific sequence of symbols (e.g. a word) as having been recognized from a handheld camera captured image. The result of act 218 may be displayed, or used to generate information for display (e.g. advertisements, or translation from one language into another).

Figure 4A:
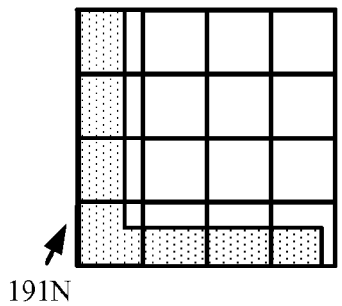
FIGS. 4A and 4B illustrate blocks 191N and 191W of the prior art that contain the letter "L" in an alphabet of the language English, written with different stroke widths.
Figure 4B:
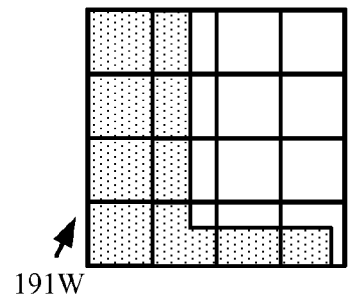

Certain described embodiments use a variant of the 4S vector, also referred to as a 3S vector that is stroke width invariant, as illustrated in FIGS. 4A-4B. FIG. 4A illustrates the letter "L" in the alphabet of the English language in a block 191N written in a font with a thin stroke width relative to FIG. 4B wherein the same letter "L" in another block 191W is written in another font with a thick stroke width. When 4S vectors are created for these two blocks 191N and 192W (using the method described above in reference to FIG. 2B), the vectors differ from one another, in each direction of traversal, in their counts of no transition in black intensity (also called black constant counts), and in their counts of no transition in white intensity (also called white constant counts).

Figure 5A:
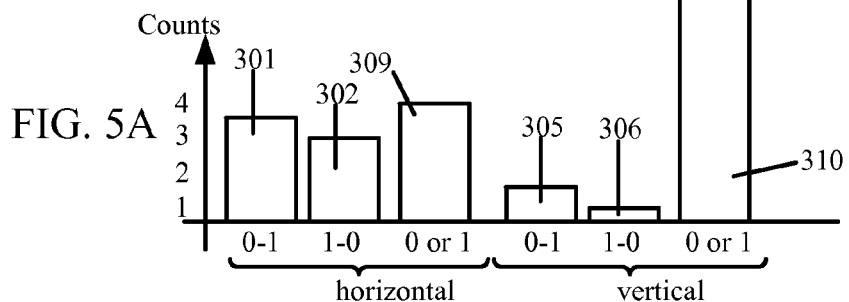
FIG. 5A illustrates, in another example, a histogram of certain described embodiments wherein six counts are generated by traversals of sub-block 121I in the two directions of FIGS. 1D and 1E.
Figure 5B:
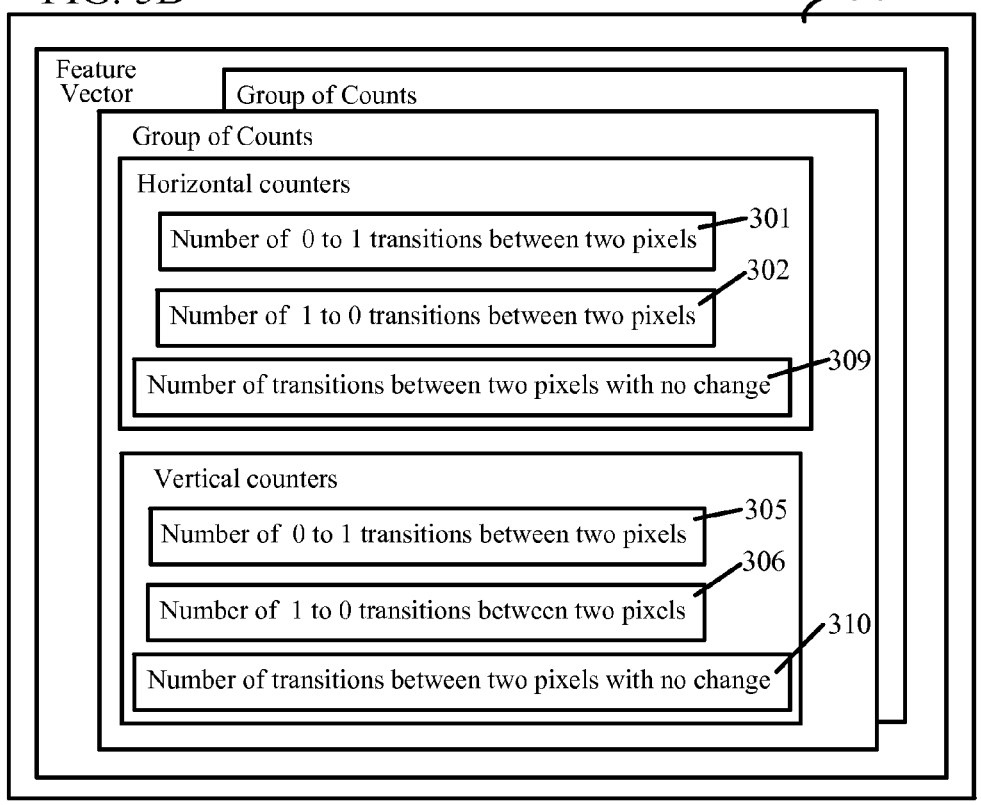
FIG. 5B illustrates, in a memory of several described embodiments, six counts (also called counters) that are incremented during traversal of a portion of the image, in two directions, namely three horizontal counters and three vertical counters.

To improve the stroke width invariance, certain embodiments maintain, in each direction of traversal, a single constant count for no transition in intensities, regardless of whether the intensity at a current pixel is black or the intensity at the current pixel is white (also called white-and-black constant count). Therefore, in the example of the 4S vector illustrated in FIG. 3B, the counts 303 and 304 are replaced by the sum of their values in a single count 309 (FIG. 5A) and the counts 307 and 308 (FIG. 3B) are also replaced by the sum of their values in a single count 310. Note that only six counts are shown in FIG. 5A, namely two gradient counts 301 and 302 and one constant count 309 in the horizontal direction, and two gradient counts 305 and 306 and one constant count 310 in the vertical direction.

In the 3S vector as well, contributions each of the N pixels of a sub-block are included S times in the counts of these embodiments. Accordingly, the just-described counts 301, 302, 309, 305, 306, 310 (FIG. 5A) are normalized to obtain the 3S vector in act 213 of some embodiments by division with N and also by division with S, i.e. by division with N*S, which in the example of FIG. 5A is also 9*2 or 18. Note that the sum of all six counts in FIG. 5A is same as the sum of all eight counts in FIG. 3B. Therefore, the sum of the normalized counts of the 3S vector also adds up to value 1, which enables 3S vectors of the described embodiments to also be used in a metric of PDF divergence (in act 216, described in detail below).

In some embodiments that use the 3S vector, the value of a constant count in a given direction is additionally obtained by subtracting the gradient counts from the total number of pixels N in a sub-block. So in the example illustrated in FIG. 5A, the constant count 309 is obtained by subtracting the gradient counts 301 and 302 from N, and similarly the constant count 310 is obtained by subtracting the gradient counts 305 and 306 from N. Accordingly, act 212 of such embodiments does not maintain two 3S counts, namely counts 309 and 310 when traversing between pixels in sub-block 121I, and instead performs the above-described subtraction at the end of such traversal.

Figure 5C:
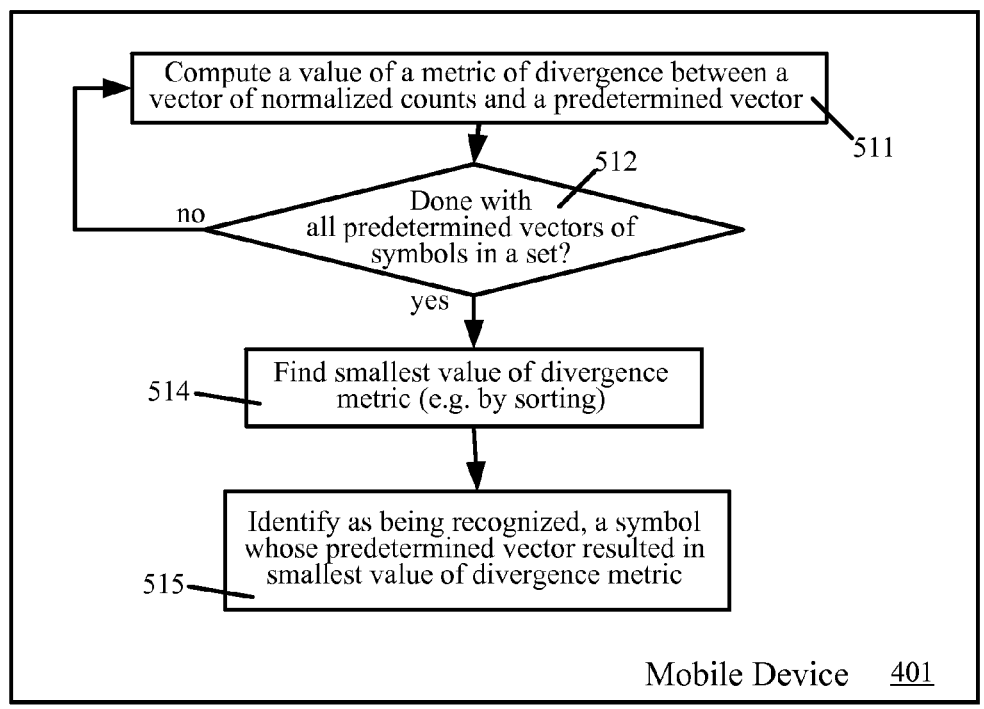
FIG. 5C illustrates, in a flow chart, acts performed in several described embodiments, to compare a vector using a metric of divergence between probability density functions.

In several of the described embodiments, act 216 described above uses a metric of divergence of probability density functions (PDFs), because the vector(s) are deliberately generated (in act 212, e.g. by a vector generator 351 in FIG. 6) to have the above-described property of adding up to the value 1, and therefore suitable for such use. Hence, some embodiments perform a method illustrated in FIG. 5C, by performing an act 511 (e.g. in a PDF comparator 352 shown in FIG. 6) to repeatedly compute a value of such a PDF divergence metric, between a vector of the normalized counts of a block and a predetermined vector of a corresponding symbol in a set until all predetermined vectors have been used (as per act 512) at which time control transfers to act 514. In act 514, a smallest value of the divergence metric that has been computed in act 511 is then determined, e.g. by sorting the results of act 511 and selecting the value at the bottom (or top, depending in the sort order). Next, in act 515, a specific symbol whose predetermined vector resulted in the smallest value of the divergence metric (i.e. whose PDF is closest to the vector of the normalized counts) is identified as being recognized in the block.

The above-described use of a metric of PDF divergence in in act 511 of the described embodiments provides a more accurate comparison than the prior art Euclidean distance or its simplified version. As will be readily apparent in view of this detailed description, any metric of divergence of probability density functions can be used in act 511, and some embodiments use the Jensen-Shannon divergence metric, as described below.

Specifically, a value of the Jensen-Shannon divergence metric is computed (e.g. in act 511) as follows in some embodiments. A predetermined vector is hereinafter P, and the vector of normalized counts for a block is hereinafter Q. In act 511, one or more processors in a mobile device 401 compute a mean vector as $$M = \frac{1}{2}(P+Q)$$

followed by computing the metric as $$\frac{1}{2}\sum_i P(i)\ln\left[\frac{P(i)}{M(i)}\right] + \frac{1}{2}\sum_i Q(i)\ln\left[\frac{Q(i)}{M(i)}\right]$$

wherein ln is natural logarithm, and wherein i represents an index to vectors P and Q.

Note that although the Jensen-Shannon divergence metric is used in some embodiments as described above, other embodiments use other metrics of divergence between probability density functions (PDFs), as will be readily apparent in view of this detailed description.

Mobile device 401 of some embodiments that performs the method shown in FIGS. 2A-2B is a mobile device, such as a smartphone that includes a camera 405 (FIG. 6) of the type described above to generate an image of a real world scene that is then processed to identify any predetermined symbol therein (such as a character of text written in the language Hindi). As noted above, mobile device 401 may further include sensors 406 that provide information on movement of mobile device 401, such as an accelerometer, a gyroscope, a compass, or the like. Mobile device 401 may use an accelerometer and a compass and/or other sensors to sense tilting and/or turning in the normal manner, to assist processor 404 in determining the orientation and position of a predetermined symbol in an image captured in mobile device 401. Instead of or in addition to sensors 406, mobile device 401 may use images from a camera 405 to assist processor 404 in determining the orientation and position of mobile device 401 relative to the predetermined symbol being imaged. Also, mobile device 401 may additionally include a graphics engine 1004 and an image processor 1005 that are used in the normal manner. Mobile device 401 may optionally include vector generator 351 and PDF comparator 352 (e.g. implemented by one or more processor(s) 404 executing software in memory 329) to identify presence of predetermined symbols in blocks received as input by OCR software 1014 (when executed by processor 404).

In some embodiments, vector generator 351 implements means for traversing a portion of the image to: identify changes in intensities of pixels in the image, and generate a group of counts based on the changes, without encoding positions at which the changes occur in the image, as described above. During operation, vector generator 351 of such embodiments uses an intensity of each pixel in the portion of the image and position of pixels (e.g. identified in a list of coordinates of pixels), to generate at least one count in the group of counts 355, wherein at least a first count in the group of counts is incremented when an intensity change between two pixels, in a direction of traversal, exceeds a predetermined threshold, and wherein at least a second count in the group of counts is incremented, when the intensity change is positive and the intensity change does not exceed the predetermined threshold. In several such embodiments, the PDF comparator 352 implements means for using a measure of difference between two probability distribution functions (PDFs). During operation, PDF comparator 352 of such embodiments compares a vector based on at least the group of counts 355 (e.g. received from vector generator 351) with vectors of corresponding symbols in a library 353 (FIG. 6), to identify a specific symbol 354 in the image.

In addition to memory 329, mobile device 401 may include one or more other types of memory such as flash memory (or SD card) 1008 and/or a hard disk and/or an optical disk (also called "secondary memory") to store data and/or software for loading into memory 329 (also called "main memory") and/or for use by processor(s) 404. Mobile device 401 may further include a wireless transmitter and receiver in transceiver 1010 and/or any other communication interfaces 1009. It should be understood that mobile device 401 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet (such as iPad available from Apple Inc) or other suitable mobile platform that is capable of creating an augmented reality (AR) environment.

A mobile device 401 of the type described above may include other position determination methods such as object recognition using "computer vision" techniques. The mobile device 401 may also include means for remotely controlling a real world object which may be a toy, in response to user input on mobile device 401 e.g. by use of transmitter in transceiver 1010, which may be an IR or RF transmitter or a wireless a transmitter enabled to transmit one or more signals over one or more types of wireless communication networks such as the Internet, WiFi, cellular wireless network or other network. The mobile device 401 may further include, in a user interface, a microphone and a speaker (not labeled). Of course, mobile device 401 may include other elements unrelated to the present disclosure, such as a read-only-memory 1007 which may be used to store firmware for use by processor 404.

Also, depending on the embodiment, a mobile device 401 may perform reference free tracking and/or reference based tracking using a local detector in mobile device 401 to detect predetermined symbols in images, in implementations that execute the OCR software 1014 to identify, e.g. characters of text in an image. The above-described identification of blocks for use by OCR software 1014 may be performed in software (executed by one or more processors or processor cores) or in hardware or in firmware, or in any combination thereof.

In some embodiments of mobile device 401, the above-described vector generator 351 and PDF comparator 352 are included in OCR software 1014 that is implemented by a processor 404 executing the software 320 in memory 329 of mobile device 401, although in other embodiments any one or more of vector generator 351 and PDF comparator 352 are implemented in any combination of hardware circuitry and/or firmware and/or software in mobile device 401. Hence, depending on the embodiment, various functions of the type described herein of OCR software may be implemented in software (executed by one or more processors or processor cores) or in dedicated hardware circuitry or in firmware, or in any combination thereof.

Accordingly, depending on the embodiment, any one or more of vector generator 351 and PDF comparator 352 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

Hence, methodologies described herein may be implemented by various means depending upon the application. For example, these methodologies may be implemented in firmware 1013 (FIG. 6) or software 320, or hardware 1012 or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

In some embodiments, an apparatus as described herein is implemented by the following: a camera implements means for receiving a portion of an image of a scene of real world and a processor is programmed to implement means for traversing at least the portion of the image to identify changes in intensities of pixels in the image and generate a group of counts based on the changes, without encoding positions at which the changes occur in the image. Depending on the embodiment, the just-described processor or another processor in the apparatus is programmed to implement means for using a measure of difference between two probability distributions, to compare a vector based on at least the group of counts with multiple predetermined vectors of corresponding symbols in a set, to identify a specific symbol therein. Furthermore, any of the just-described processors may be configured to implement means for storing the specific symbol in a memory, as being recognized in the image.

Any machine-readable medium tangibly embodying software instructions (also called "computer instructions") may be used in implementing the methodologies described herein. For example, software 320 (FIG. 6) may include program codes stored in memory 329 and executed by processor 404. Memory may be implemented within or external to the processor 404. Memory 329 may be coupled to processor 404 by a bus 1111 (FIG. 6). In some embodiments, bus 1111 is used by processor 404 to implement means for storing in memory 329, a specific symbol 354 recognized in an image by processor(s) 404. In several such embodiments, bus 1111 is additionally used by processor 404 to implement means for receiving from memory 329, an image (or a portion thereof) of a scene of real world. If implemented in firmware and/or software, the functions may be stored as one or more instructions or code on a computer-readable medium. Examples include non-transitory computer-readable storage media encoded with a data structure and computer-readable storage media encoded with a computer program.

A non-transitory computer-readable storage media includes physical computer storage media. A storage medium may be any available medium that can be accessed by a computer. By way of example, and not limitation, such non-transitory computer-readable media can comprise RAM, ROM, Flash Memory, EEPROM, CD-ROM or other optical disk storage, magnetic disk storage or other magnetic storage devices, or any other non-transitory medium that can be used to store program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although illustrated in connection with specific embodiments for instructional purposes, the embodiments are not limited thereto. Hence, although an item shown in FIGS. 2A-2B and 5B of some embodiments is a mobile device 401, in other embodiments such an item is implemented by use of form factors that are different, e.g. in certain other embodiments the item is a mobile platform (such as a tablet, e.g. iPad available from Apple, Inc.) while in still other embodiments the item is any electronic device or system. Illustrative embodiments of such an electronic device or system may include multiple physical parts that intercommunicate wirelessly, such as a processor and a memory that are portions of a stationary computer, such as a lap-top computer, a desk-top computer, or a server computer 1015 communicating over one or more wireless link(s) with sensors and user input circuitry enclosed in a housing of mobile device 401 (FIG. 6) that is small enough to be held in a hand.

Depending on a specific symbol recognized in a handheld camera captured image, a user can receive different types of feedback depending on the embodiment. Additionally haptic feedback (e.g. by vibration of mobile device 401) is provided by triggering haptic feedback circuitry 1018 (FIG. 6) in some embodiments, to provide feedback to the user when text is recognized in an image. Instead of the just-described haptic feedback, audio feedback may be provided via a speaker in mobile device 401, in other embodiments.

Various adaptations and modifications may be made without departing from the scope of the embodiments. Therefore, the spirit and scope of the appended claims should not be limited to the foregoing description. It is to be understood that several other aspects of the embodiments will become readily apparent to those skilled in the art from the description herein, wherein it is shown and described various aspects by way of illustration. Numerous such embodiments are encompassed by the attached claims.

The invention claimed is:

1. A method of symbol recognition, the method comprising:
   receiving a portion of an image of a scene of real world;
   traversing at least the portion of the image to:
     identify changes in intensities of pixels in the image; and
     generate a group of counts based on the changes, without encoding positions at which the changes occur in the image;
   wherein an intensity of each pixel in the portion of the image is used to generate at least one count in the group of counts;
   wherein a size of the group of counts is predetermined;
   wherein at least a first count in the group of counts is incremented, when an intensity change between two pixels, in a direction of traversal, exceeds a predetermined threshold;
   wherein at least a second count in the group of counts is incremented, when the intensity change is positive and the intensity change does not exceed the predetermined threshold;
   using a measure of difference between two probability distributions, to compare a vector that is based on at least the group of counts with a plurality of predetermined vectors of corresponding symbols in a set, to identify a specific symbol therein; and storing the specific symbol in a memory, as being recognized in the image;
wherein the memory is coupled to one or more processors; and
wherein the traversing and the using are performed by the one or more processors.

2. The method of claim 1 wherein the portion is hereinafter referred to as a sub-block, and the sub-block is one of a plurality of sub-blocks comprised in a block in the image, the method further comprising:
dividing the block in the image to obtain the plurality of sub-blocks; and
assembling the vector by appending to one another, a plurality of groups of counts including said group of counts generated by the traversing;
wherein the plurality of groups of counts are obtained from the plurality of sub-blocks, by repeating the traversing; and
wherein the plurality of groups of counts are appended in a predetermined order, to obtain the vector.

3. The method of claim 2 wherein:
the block is identified by use of a predetermined test; and
the predetermined test is to detect pixels in the image that form a shiro-rekha;
wherein the shiro-rekha connects a plurality of tops of characters, of a word in Devanagari.

4. The method of claim 1 further comprising:
the one or more processors dividing each count in the group of counts by at least a total number of pixels N in the portion of the image.

5. The method of claim 1 wherein:
the portion is traversed multiple times in multiple directions respectively.

6. The method of claim 1 wherein:
the first count is incremented during the traversing when the direction of traversal is a predetermined first direction;
the second count is incremented during the traversing when the direction of traversal is the predetermined first direction;
a third count in the group of counts is incremented during the traversing when the intensity change, in the predetermined first direction, is negative and an absolute value thereof exceeds the predetermined threshold;
wherein a predetermined second direction is perpendicular to the predetermined first direction;
a fourth count in the group of counts is incremented during the traversing when the direction of traversal is the predetermined second direction, and the intensity change does not exceed the predetermined threshold;
a fifth count in the group of counts is incremented during the traversing when the direction of traversal is the predetermined second direction, and the intensity exceeds the predetermined threshold; and
a sixth count in the group of counts is incremented during the traversing when the intensity change, in the predetermined second direction, is negative and the absolute value thereof exceeds the predetermined threshold.

7. The method of claim 1 wherein:
the first count is incremented during the traversing when the direction of traversal is a predetermined first direction;
the second count is incremented during the traversing when the direction of traversal is the predetermined first direction;
a third count in the group of counts is incremented during the traversing when the intensity change, in the predetermined first direction, is negative and an absolute value thereof exceeds the predetermined threshold;
a fourth count is incremented during the traversing when the intensity change, in the predetermined first direction, is negative and the absolute value thereof does not exceed the predetermined threshold;
wherein a predetermined second direction is perpendicular to the predetermined first direction;
a fifth count in the group of counts is incremented during the traversing when the direction of traversal is the predetermined second direction, and the intensity change does not exceed the predetermined threshold;
a sixth count in the group of counts is incremented during the traversing when the direction of traversal is the predetermined second direction, and the intensity exceeds the predetermined threshold;
a seventh count in the group of counts is incremented during the traversing when the intensity change, in the predetermined second direction, is negative and the absolute value thereof exceeds the predetermined threshold; and
an eighth count is incremented during the traversing when the intensity change, in the predetermined second direction, is negative and the absolute value thereof does not exceed the predetermined threshold.

8. The method of claim 1 wherein:
the intensities of pixels in the image are binarized;
a third count in the group of counts is incremented during the traversing when the direction of traversal is a predetermined first direction, and the intensity change between said two pixels is from the second intensity of binary value 1 to the first intensity of binary value 0;
wherein a predetermined second direction is perpendicular to the predetermined first direction;
a fourth count in the group of counts is incremented during the traversing when the intensity change, in the predetermined second direction, is non-existent and the intensity of each of said two pixels is identical, of binary value 0 or 1;
a fifth count in the group of counts is incremented during the traversing when the direction of traversal is the predetermined second direction, and the intensity change between said two pixels is from the first intensity of binary value 0 to the second intensity of binary value 1; and
a sixth count in the group of counts is incremented during the traversing when the direction of traversal is the predetermined second direction, and the intensity change between said two pixels is from the second intensity of binary value 1 to the first intensity of binary value 0.

9. The method of claim 1 wherein:
the intensities of pixels in the image are binarized;
a third count is incremented during the traversing when the intensity change, in a predetermined first direction, is non-existent and the intensity of each of said two pixels is identical to binary value 1;
a fourth count in the group of counts is incremented during the traversing when the direction of traversal is the predetermined first direction, and the intensity change between said two pixels is from binary value 1 to binary value 0;
wherein a predetermined second direction is perpendicular to the predetermined first direction;
a fifth count in the group of counts is incremented during the traversing when the intensity change, in the predetermined second direction, is non-existent and the intensity of each of said two pixels is identical to binary value 0;

a sixth count in the group of counts is incremented during the traversing when the intensity change, in the predetermined second direction, is non-existent and the intensity of each of said two pixels is identical to binary value 1;

a seventh count in the group of counts is incremented during the traversing when the direction of traversal is the predetermined second direction, and the intensity change between said two pixels is from binary value 0 to binary value 1; and a eighth count in the group of counts is incremented during the traversing when the direction of traversal is the predetermined second direction, and the intensity change between said two pixels is from binary value 1 to binary value 0.

10. The method of claim 1 wherein the specific symbol is at least one of:
a predetermined logo;
a traffic sign; or
a predetermined letter of an alphabet written in a predetermined font.

11. The method of claim 1 wherein said using of the measure of difference comprises:
computing a plurality of values of the measure of difference, respectively between said vector and said plurality of predetermined vectors of corresponding symbols; and
identifying a value among the plurality of values for being smallest;
wherein a predetermined vector, of the specific symbol identified as being recognized in the image, is used in said computing of the value identified as being smallest.

12. The method of claim 1 wherein:
wherein a predetermined vector of the specific symbol is hereinafter P and the vector for said portion of the image is hereinafter Q, the method further comprising:
computing a mean vector as $$M = \frac{1}{2}(P+Q);$$

and
computing the measure of difference as $$\frac{1}{2}\sum_i P(i)\ln\left[\frac{P(i)}{M(i)}\right] + \frac{1}{2}\sum_i Q(i)\ln\left[\frac{Q(i)}{M(i)}\right]$$

wherein ln is natural logarithm and i is an index representing an element of vectors P and Q.

13. A mobile device to perform symbol recognition, the mobile device comprising:
one or more memories comprising a plurality of portions identified from an image of a scene of real world, as candidates to be recognized;
one or more processors configured to traverse at least one portion of the image to:
identify changes in intensities of pixels in the image; and
generate a group of counts based on the changes, without encoding positions at which the changes occur in the image;
wherein an intensity of each pixel in the at least one portion of the image is used to generate at least one count in the group of counts;
wherein a size of the group of counts is predetermined;
wherein at least a first count in the group of counts is incremented, when an intensity change between two pixels, in a direction of traversal, exceeds a predetermined threshold;
wherein at least a second count in the group of counts is incremented, when the intensity change is positive and the intensity change does not exceed the predetermined threshold;
wherein the one or more processors are configured to use a measure of difference between two probability distributions, to compare a vector based on at least the group of counts with a plurality of predetermined vectors of corresponding symbols in a set, to identify a specific symbol therein; and
wherein the one or more processors are configured to store the specific symbol in a memory, as being recognized in the image;
wherein the memory is coupled to the one or more processors.

14. The mobile device of claim 13 wherein:
the first count is incremented by the one or more processors during the traversing when the direction of traversal is a predetermined first direction;
the second count is incremented by the one or more processors during the traversing when the direction of traversal is the predetermined first direction;
a third count in the group of counts is incremented by the one or more processors during the traversing when the intensity change, in the predetermined first direction, is negative and an absolute value thereof exceeds the predetermined threshold;
wherein a predetermined second direction is perpendicular to the predetermined first direction;
a fourth count in the group of counts is incremented by the one or more processors during the traversing when the direction of traversal is the predetermined second direction, and the intensity change does not exceed the predetermined threshold;
a fifth count in the group of counts is incremented by the one or more processors during the traversing when the direction of traversal is the predetermined second direction, and the intensity exceeds the predetermined threshold; and
a sixth count in the group of counts is incremented by the one or more processors during the traversing when the intensity change, in the predetermined second direction, is negative and the absolute value thereof exceeds the predetermined threshold.

15. The mobile device of claim 13 wherein:
the first count is incremented by the one or more processors during the traversing when the direction of traversal is a predetermined first direction;
the second count is incremented by the one or more processors during the traversing when the direction of traversal is the predetermined first direction;
a third count in the group of counts is incremented by the one or more processors during the traversing when the intensity change, in the predetermined first direction, is negative and an absolute value thereof exceeds the predetermined threshold;
a fourth count is incremented by the one or more processors during the traversing when the intensity change, in the predetermined first direction, is negative and the absolute value thereof does not exceed the predetermined threshold;

wherein a predetermined second direction is perpendicular to the predetermined first direction;

a fifth count in the group of counts is incremented by the one or more processors during the traversing when the direction of traversal is the predetermined second direction, and the intensity change does not exceed the predetermined threshold;

a sixth count in the group of counts is incremented by the one or more processors during the traversing when the direction of traversal is the predetermined second direction, and the intensity exceeds the predetermined threshold;

a seventh count in the group of counts is incremented by the one or more processors during the traversing when the intensity change, in the predetermined second direction, is negative and the absolute value thereof exceeds the predetermined threshold; and an eighth count is incremented by the one or more processors during the traversing when the intensity change, in the predetermined second direction, is negative and the absolute value thereof does not exceed the predetermined threshold.

16. The mobile device of claim 13 wherein:

the intensities of pixels in the image are binarized;

a third count in the group of counts is incremented by the one or more processors during the traversing when the direction of traversal is a predetermined first direction, and the intensity change between said two pixels is from the second intensity of binary value 1 to the first intensity of binary value 0;

wherein a predetermined second direction is perpendicular to the predetermined first direction;

a fourth count in the group of counts is incremented by the one or more processors during the traversing when the intensity change, in the predetermined second direction, is non-existent and the intensity of each of said two pixels is identical, of binary value 0 or 1;

a fifth count in the group of counts is incremented by the one or more processors during the traversing when the direction of traversal is the predetermined second direction, and the intensity change between said two pixels is from the first intensity of binary value 0 to the second intensity of binary value 1; and a sixth count in the group of counts is incremented by the one or more processors during the traversing when the direction of traversal is the predetermined second direction, and the intensity change between said two pixels is from the second intensity of binary value 1 to the first intensity of binary value 0.

17. The mobile device of claim 13 wherein:

the intensities of pixels in the image are binarized;

a third count is incremented by the one or more processors during the traversing when the intensity change, in a predetermined first direction, is non-existent and the intensity of each of said two pixels is identical to binary value 1;

a fourth count in the group of counts is incremented by the one or more processors during the traversing when the direction of traversal is the predetermined first direction, and the intensity change between said two pixels is from binary value 1 to binary value 0;

wherein a predetermined second direction is perpendicular to the predetermined first direction;

a fifth count in the group of counts is incremented by the one or more processors during the traversing when the intensity change, in the predetermined second direction, is non-existent and the intensity of each of said two pixels is identical to binary value 0;

a sixth count in the group of counts is incremented by the one or more processors during the traversing when the intensity change, in the predetermined second direction, is non-existent and the intensity of each of said two pixels is identical to binary value 1;

a seventh count in the group of counts is incremented by the one or more processors during the traversing when the direction of traversal is the predetermined second direction, and the intensity change between said two pixels is from binary value 0 to binary value 1; and a eighth count in the group of counts is incremented by the one or more processors during the traversing when the direction of traversal is the predetermined second direction, and the intensity change between said two pixels is from binary value 1 to binary value 0.

18. One or more non-transitory storage media comprising instructions, which, when executed in a mobile device, cause one or more processors in the mobile device to perform operations, the instructions comprising:

instructions to receive a portion of an image of a scene of real world;

instructions to traverse at least the portion of the image to:
identify changes in intensities of pixels in the image; and
generate a group of counts based on the changes, without encoding positions at which the changes occur in the image;

wherein an intensity of each pixel in the portion of the image is used to generate at least one count in the group of counts;

wherein a size of the group of counts is predetermined;

wherein at least a first count in the group of counts is incremented, when an intensity change between two pixels, in a direction of traversal, exceeds a predetermined threshold;

wherein at least a second count in the group of counts is incremented, when the intensity change is positive and the intensity change does not exceed the predetermined threshold;

instructions to use a measure of difference between two probability distributions, to compare a vector based on at least the group of counts with a plurality of predetermined vectors of corresponding symbols in a set, to identify a specific symbol therein; and instructions to store the specific symbol in a memory, as being recognized in the image;

wherein the memory is coupled to the one or more processors.

19. The one or more non-transitory storage media of claim 18 wherein:

the first count is incremented by execution of instructions to traverse when the direction of traversal is a predetermined first direction;

the second count is incremented by execution of instructions to traverse when the direction of traversal is the predetermined first direction;

a third count in the group of counts is incremented by execution of instructions to traverse when the intensity change, in the predetermined first direction, is negative and an absolute value thereof exceeds the predetermined threshold;

wherein a predetermined second direction is perpendicular to the predetermined first direction;

a fourth count in the group of counts is incremented by execution of instructions to traverse when the direction of traversal is the predetermined second direction, and the intensity change does not exceed the predetermined threshold;

a fifth count in the group of counts is incremented by execution of instructions to traverse when the direction of traversal is the predetermined second direction, and the intensity exceeds the predetermined threshold; and a sixth count in the group of counts is incremented by execution of instructions to traverse when the intensity change, in the predetermined second direction, is negative and the absolute value thereof exceeds the predetermined threshold.

20. The one or more non-transitory storage media of claim 18 wherein:

the first count is incremented by execution of instructions to traverse when the direction of traversal is a predetermined first direction;

the second count is incremented by execution of instructions to traverse when the direction of traversal is the predetermined first direction;

a third count in the group of counts is incremented by execution of instructions to traverse when the intensity change, in the predetermined first direction, is negative and an absolute value thereof exceeds the predetermined threshold;

a fourth count is incremented by execution of instructions to traverse when the intensity change, in the predetermined first direction, is negative and the absolute value thereof does not exceed the predetermined threshold;

wherein a predetermined second direction is perpendicular to the predetermined first direction;

a fifth count in the group of counts is incremented by execution of instructions to traverse when the direction of traversal is the predetermined second direction, and the intensity change does not exceed the predetermined threshold;

a sixth count in the group of counts is incremented by execution of instructions to traverse when the direction of traversal is the predetermined second direction, and the intensity exceeds the predetermined threshold;

a seventh count in the group of counts is incremented by execution of instructions to traverse when the intensity change, in the predetermined second direction, is negative and the absolute value thereof exceeds the predetermined threshold; and an eighth count is incremented by execution of instructions to traverse when the intensity change, in the predetermined second direction, is negative and the absolute value thereof does not exceed the predetermined threshold.

21. An apparatus for symbol recognition, the apparatus comprising:

means for receiving a portion of an image of a scene of real world;

means for traversing the portion of the image to:
identify changes in intensities of pixels in the image; and
generate a group of counts based on the changes, without encoding positions at which the changes occur in the image;

wherein an intensity of each pixel in the portion of the image is used to generate at least one count in the group of counts;

wherein a size of the group of counts is predetermined;

wherein at least a first count in the group of counts is incremented, when an intensity change between two pixels, in a direction of traversal, exceeds a predetermined threshold;

wherein at least a second count in the group of counts is incremented, when the intensity change is positive and the intensity change does not exceed the predetermined threshold;

means for using a measure of difference between two probability distributions, to compare a vector based on at least the group of counts with a plurality of predetermined vectors of corresponding symbols in a set, to identify a specific symbol therein; and means for storing the specific symbol in a memory, as being recognized in the image;

wherein the memory is coupled to one or more processors.

22. The apparatus of claim 21 wherein:

the first count is incremented by the means for traversing when the direction of traversal is a predetermined first direction;

the second count is incremented by the means for traversing when the direction of traversal is the predetermined first direction;

a third count in the group of counts is incremented by the means for traversing when the intensity change, in the predetermined first direction, is negative and an absolute value thereof exceeds the predetermined threshold;

wherein a predetermined second direction is perpendicular to the predetermined first direction;

a fourth count in the group of counts is incremented by the means for traversing when the direction of traversal is the predetermined second direction, and the intensity change does not exceed the predetermined threshold;

a fifth count in the group of counts is incremented by the means for traversing when the direction of traversal is the predetermined second direction, and the intensity exceeds the predetermined threshold; and a sixth count in the group of counts is incremented by the means for traversing when the intensity change, in the predetermined second direction, is negative and the absolute value thereof exceeds the predetermined threshold.

23. The apparatus of claim 21 wherein:

the first count is incremented by the means for traversing when the direction of traversal is a predetermined first direction;

the second count is incremented by the means for traversing when the direction of traversal is the predetermined first direction;

a third count in the group of counts is incremented by the means for traversing when the intensity change, in the predetermined first direction, is negative and an absolute value thereof exceeds the predetermined threshold;

a fourth count is incremented by the means for traversing when the intensity change, in the predetermined first direction, is negative and the absolute value thereof does not exceed the predetermined threshold;

wherein a predetermined second direction is perpendicular to the predetermined first direction;

a fifth count in the group of counts is incremented by the means for traversing when the direction of traversal is the predetermined second direction, and the intensity change does not exceed the predetermined threshold;

a sixth count in the group of counts is incremented by the means for traversing when the direction of traversal is the predetermined second direction, and the intensity exceeds the predetermined threshold;

a seventh count in the group of counts is incremented by the means for traversing when the intensity change, in the predetermined second direction, is negative and the absolute value thereof exceeds the predetermined threshold; and an eighth count is incremented by the means for traversing when the intensity change, in the predetermined second direction, is negative and the absolute value thereof does not exceed the predetermined threshold.

\* \* \* \* \*